US011496160B2

(12) United States Patent
Helmboldt

(10) Patent No.: US 11,496,160 B2
(45) Date of Patent: Nov. 8, 2022

(54) RADIO TELESCOPE ARRAY FOR PASSIVE IONOSPHERIC REMOTE SENSING

(71) Applicant: The Government of the United States of America, as represented by the Secretary of the Navy, Arlington, VA (US)

(72) Inventor: Joseph Helmboldt, Crofton, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 5 days.

(21) Appl. No.: 17/383,233

(22) Filed: Jul. 22, 2021

(65) Prior Publication Data

US 2022/0029642 A1    Jan. 27, 2022

Related U.S. Application Data

(60) Provisional application No. 63/055,356, filed on Jul. 23, 2020.

(51) Int. Cl.
*H04M 1/00* (2006.01)
*H04B 1/00* (2006.01)
*H04B 7/22* (2006.01)

(52) U.S. Cl.
CPC ............. *H04B 1/0003* (2013.01); *H04B 7/22* (2013.01)

(58) Field of Classification Search
CPC ................................ H04B 1/0003; H04B 7/22

USPC ....................................................... 455/552.1
See application file for complete search history.

(56) References Cited

U.S. PATENT DOCUMENTS

| 9,225,074 B2 | 12/2015 | Hicks et al. | |
| 10,700,768 B1* | 6/2020 | Frost | H04B 7/04 |
| 2003/0158954 A1* | 8/2003 | Williams | H04L 9/40 709/230 |
| 2020/0371245 A1* | 11/2020 | Murphy | G01S 19/36 |

OTHER PUBLICATIONS

Aarons et al., "Scintillation of a Radio Star a a Subauroral Latitude", Radio Sceince, vol. 1, Issue 10, Oct. 1966, pp. 1180-1186, 7 pages.
Aarons et al., "Frequency Dependence of Radio Star Scintillations", Journal of Geophysical Research, vol. 72, Issue 11, Jun. 1, 1967, pp. 2891-2902, 12 pages.
Ananthakrishnan, S. "The Giant Meterwave Radio Telescope", Journal of Astrophysics and Astronomy Supplement, vol. 16, Jan. 1995, pp. 427-435, 9 pages.
(Continued)

*Primary Examiner* — Tanmay K Shah
(74) *Attorney, Agent, or Firm* — US Naval Research Laboratory; Hong-Vinh Nguyen

(57) ABSTRACT

A radio telescope array is provided for tracking radio sources that are essentially infinitely stable and resilient transmitters. The radio telescope array may be implemented with just a few antennas in different applications, such as an ionospheric density gradiometer or an imaging scintillometer. Data received at the radio telescope array may be utilized for various purposes, for example, to analyze ionospheric variations, study bursts of radio emission or monitor cosmic objects.

20 Claims, 15 Drawing Sheets

(56) References Cited

OTHER PUBLICATIONS

Benz et al., "Calisto—A New Concept for Solar Radio Spectrometer", Solar Physics, vol. 226, Issue 1, Jan. 1995, pp. 143-151, 9 pages.
Bochenek et al., "A Fast Radio Burst Associated with a Galactic Magetar", Nature, vol. 587, Nov. 4, 2020, pp. 59-62, 13 pages.
Carrano et al., "On the Relationship Between the Rate of Change of Total Electron Content Index (ROTI), Irregularity Strength (CkL), and the Scintillation Index (S4)", Journal of Geophysical Research: Space Physics, vol. 124, 2019, pp. 2099-2112, 14 pages.
Clarke et al., "Probing Jovian Decametric Emission with the Long Wavelength Array Station 1", Journal of Geophysical Research: Space Physics, vol. 119, 2014, pp. 9508-9526.
Cohen et al., "Probing Fine-Scale Ionospheric Structure with the Very Large Array Radio Telescope", The Astronomical Journal, vol. 138, Aug. 2009, pp. 349-447, 9 pages.
Taylor et al., "Synthesis Imaging in Radio Astronomy II", vol. 180, Chapter "Self-Calibration", 1999, 14 pages.
Cotton et al., "Beyond the isoplanatic patch in the VLA Low-frequency Sky Survey", Ground-based Telescopes, proceedings of the SPIE, vol. 5489, 2004, pp. 180-189, 10 pages.
De Gasperin et al. "Cassiopeia A, Cygnus A, Taurus A, and Virgo A at ultra-low radio frequencies", Astronomy and Astrophysics, vol. 635, Mar. 2020, 7 pages.
Eastwood et al., "The Radio Sky at Meter Wavelengths: m-mode Analysis Imaging with the OVRO-LWA", Astronomical Journal, vol. 156(1), Jul. 2018, 23 pages.
Ellingson et al., "The LWA1 Radio Telescope", IEEE Transactions on Antennas and Propagation, vol. 61, May 2013, 10 pages.
Helmboldt et al., "The Deployable Low-band Ionosphere and Transient Experiment (DLITE)", Radio Science, vol. 56, Issue 7, Jun. 28, 2021, 29 pages.
Helmboldt et al., "The via low-band ionosphere and transient experiment (vlite): Ionospheric signal processing and analysis", Radio Science, vol. 54, 2019, 34 pages.
Helmboldt et al., "Passive all-sky imaging radar in the HF regime with WWV and the first station of the Long Wavelength Array", Radio Science, vol. 48, Sep. 2013, pp. 491-512, 22 pages.
Helmboldt et al., "Ionospheric irregularities observed during the gleam survey," Radio Science, vol. 55, 2020, 15 pages.
Helmboldt et al., "Climatology of midlatitude ionospheric disturbances from the Very Large Array Low-frequency Sky Survey", Radio Science, vol. 47, Oct. 2012, 19 pages.
Helmboldt et al., "High-precision measurements of ionospheric TEC gradients with the VeryLarge Array VHF system", Radio Science, vol. 47, Feb. 2012, 23 pages.

Hicks et al., "A Wide-Band, Active Antenna System for Long Wavelength Radio Astronomy", Publications of the Astronomical Society of the Pacific, vol. 124, Oct. 2012, 15 pages.
Jacobson et al., "Wavenumber-resolved observations of ionospheric waves using the Very Large Array telescope", Planetary and Space Science, vol. 40, Apr. 1992, pp. 447-455, 9 pages.
Kassim et al., "The 74 MHz System on the Very Large Array", Astrophysical Journal Supplement Series, vol. 172, Oct. 2007, pp. 686-719, 34 pages.
Kumagai, "Mid-latitude Ionospheric Scintillations and Geomagnetic Activity", Journal of Geomagnetism and Geoelectricity, vol. 38, Jan. 1986, pp. 367-274, 8 pages.
Kundu, "The Nature of Type IV Solar Radio Bursts", Journal of the Physical Society of Japan, vol. 17, Supplement A-II, Jan. 1962, 5 pages.
Law et al., "All Transients, All the Time: Real-time Radio Transient Detection with Interferometric Closure Quantities", Astrophysical Journal, vol. 749, Apr. 2012, 7 pages.
Lazio et al., "Surveying the Dynamic Radio Sky with the Long Wavelength Demonstrator Array", Astronomical Journal, vol. 140, Dec. 2010, 20 pages.
Melrose, "The Emission Mechanisms for Solar Radio Bursts", Space Science Reviews, vol. 26, May 1980, pp. 3-38, 36 pages.
Mevius et al., "Probing ionospheric structures using the lofar radio telescope" Radio Science, vol. 51, 2016, pp. 927-941, 15 pages.
Nickisch et al., "Hicirf: A high-fidelity hf channel simulation", Radio Science, vol. 47, 2012, 10 pages.
Rino, "A power law phase screen model for ionospheric scintillation: 1. weak scatter", Radio Science, vol. 14, 1979, 11 pages.
Siefring et al., "The CERTO Beacon on CASSIOPE/e-POP and Experiments Using High-Power HF Ionospheric Heaters", Space Science Reviews, vol. 189, Jun. 2015, pp. 107-122, 16 pages.
Sino et al., "Mid-latitude ionospheric scintillations of VHF radio signals associate with peculiar fluctuations of Faraday rotation", Journal of Atmospheric and Terrestrial Physics, vol. 40, Apr. 1978, pp. 503-506, 4 pages.
Sullivan, "Some Highlights of Interferometry in Early Radio Astronomy", Radio Interferometry: Theory, Techniques and Applications, IAU Coll. 131, ASP Conference Series, vol. 19, 1991, 18 pages.
Taylor et al., "First Light for the First Station of the Long Wavelength Array", Journal of Astronomical Instrumentation, vol. 1, Dec. 2012, 29 pages.
Tingay et al., "The Murchison Widefield Array: The Square Kilometre Array Precursor at Low Radio Frequencies", Publications of the Astronomical Society of Australia, vol. 30, Jan. 2013, 20 pages.
Van Haarlem et al., "LOFAR: the LOw-Frequency ARray", Astronomy and Astrophysics, vol. 556, Aug. 2013, 56 pages.

\* cited by examiner

RADIO TELESCOPE ARRAY FOR PASSIVE IONOSPHERIC REMOTE SENSING

CROSS-REFERENCE TO RELATED APPLICATIONS

This application is a non-provisional application of U.S. provisional application No. 63/055,356 filed on Jul. 23, 2020, the contents of which is incorporated herein by reference in its entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case Number 113280-US2.

STATEMENT REGARDING PRIOR DISCLOSURE BY THE INVENTOR

A prior disclosure was made by the inventor with other named authors. See Joseph Helmboldt et al., "The Deployable Low-band Ionosphere and Transient Experiment (DLITE)," *Radio Science*, Volume 56, Issue 7, e2021RS007298, 28 Jun. 2021, the content of which is incorporated herein by reference in its entirety. Those other authors who are not named as inventors of this patent application were working under the direction and supervision of the named inventor.

BACKGROUND

Variations in ion density within Earth's ionosphere may be remotely sensed with a variety of methods. These include active radar systems that require relatively powerful transmitters; satellite radio frequency beacon measurements, which offer sparse temporal and spatial coverage or low sensitivity; and optical airglow imagers that only work at night. An alternative is a low frequency (<500 megahertz) radio telescope that can track apparent motions of naturally occurring radio sources (e.g., radio galaxies) caused by subtle changes in ionospheric electron density. Such a telescope works day or night in all weather conditions and is completely passive. However, this telescope tends to be relatively large, expensive, and difficult to relocate to areas of interest, especially those where satellite beacon measurements may be difficult.

In recent years, due to the success of telescopes such as the Very Large Array, the Long Wavelength Array, the Low Frequency Array, and the Murchison Widefield Array, low-frequency radio astronomy has experienced a resurgence. While these instruments have facilitated exciting and unique ionospheric/plasmapheric research, they all suffer from a shared area of weakness: portability. Many of these new telescopes rely on phased arrays of relatively small antennas. Since they are designed for astronomy, sensitivity is paramount, which means they include hundreds or thousands of antennas to maximize the collecting area. Thus, they are fixed installations that are typically multi-million-dollar facilities and collectively probe the ionosphere in only a handful of regions, typically at mid-latitudes where the ionosphere is less active.

In addition, since these telescopes are primarily designed for astronomical research, observations suitable to ionospheric research are usually few and far between. This is because density fluctuations within the Earth's ionosphere complicate radio-frequency astronomical observations, especially in the very high frequency (VHF) regime, typically 30-300 megahertz (MHz). In particular, synthesis imaging interferometers with baselines longer than a few kilometers may lose coherence and therefore unable to image radio sources within this frequency regime.

SUMMARY

This Summary is intended to introduce, in simplified form, a selection of concepts that are further described in the Detailed Description. This Summary is not intended to identify key or essential features of the claimed subject matter, nor is it intended to be used as an aid in determining the scope of the claimed subject matter. Instead, it is merely presented as a brief overview of the subject matter described and claimed herein.

Embodiments described herein are directed to a radio telescope array that incorporates software defined radio technology with very high frequency antennas to track radio sources that are essentially infinitely stable and resilient transmitters. The radio telescope array may be implemented with just a few antennas in different applications, such as an ionospheric density gradiometer or an imaging scintillometer. The sparse array enables tracking of multiple sources when beaming forming is not possible at a low cost, for example, in materials and computing resources. Data received at the telescope array may be utilized for various purposes, such as to analyze ionospheric variations, study bursts of radio emission or monitor cosmic objects (e.g., the Sun, Jupiter, Cassiopeia A).

An embodiment is directed to a system comprising a digital backend. The digital backend includes a bias-t unit, a first software-defined radio and a second software-defined radio, each being communicatively connected to the bias-t unit and a reference clock, and a processing unit configured to be coupled to the first software-defined radio and the second software-defined radio. The system further comprises a first antenna and a second antenna, each being communicatively coupled with the digital backend and configured to receive visibility data by tracking a plurality of radio sources.

Another embodiment is directed to a method for analyzing ionospheric data. The method includes obtaining visibility data of a plurality of radio sources received at a low-band, sparse radio telescope array to generate time-averaged data. The method further includes performing fringe stopping to generate fringe-stopped data based on the time-averaged data; performing confusion mitigation of the fringe-stopped data to generate confusion-corrected data; and generating postage stamp images for the sources using the postage stamp images. The method further includes outputting ionosphere analysis data based on the source properties.

Yet another embodiment is directed to a method for baseline imaging. The method comprises obtaining time-averaged data that is derived from visibility data of a plurality of radio sources received at a low-band, sparse radio telescope array. The method also includes performing data selection based on the time-averaged data; performing non-fringing interference mitigation on unflagged time-averaged data to generate mitigated data; and generating a sky intensity image based on a sky position of each source and the mitigated data.

DETAILED DESCRIPTION

Definitions

Figure 1:
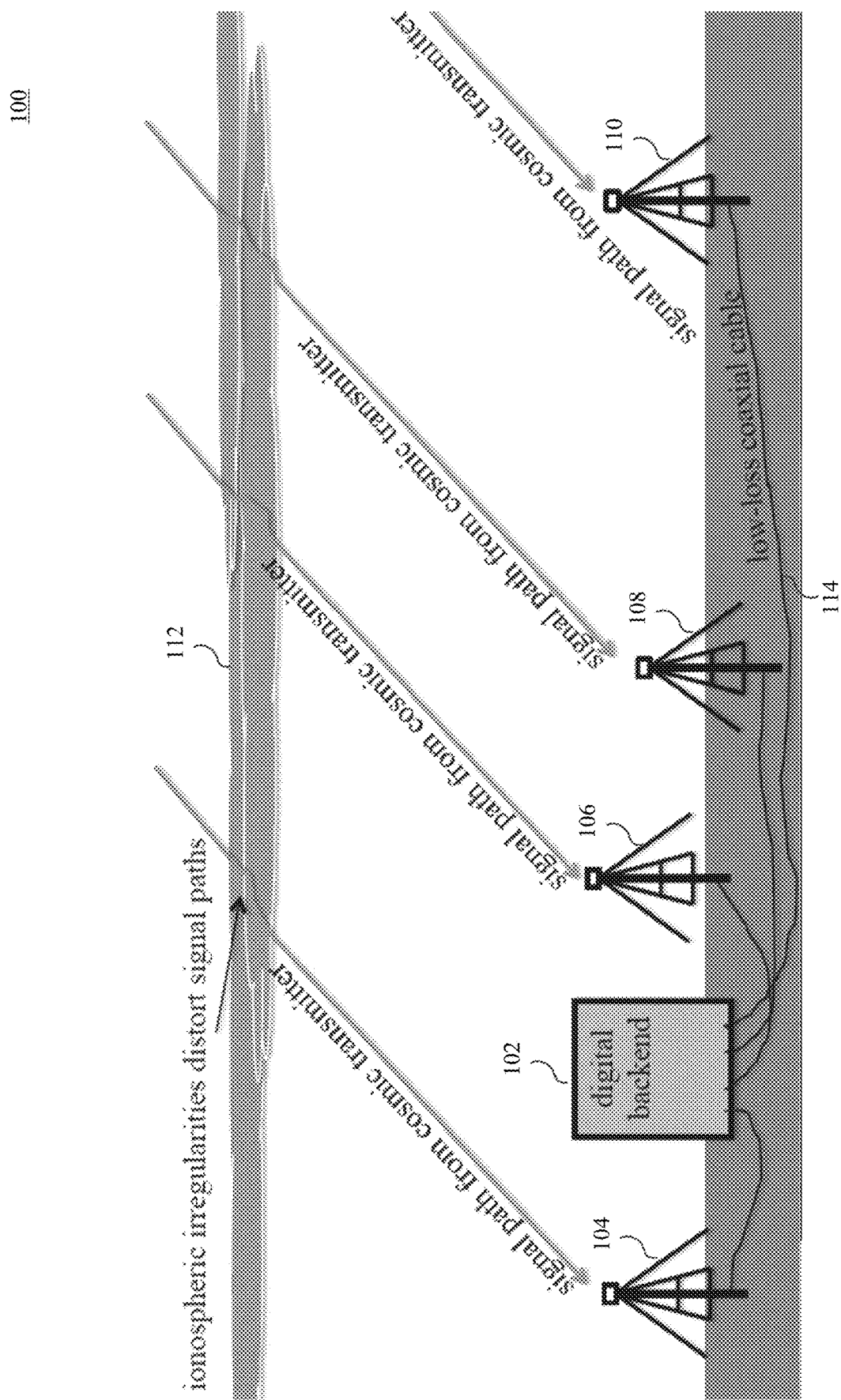
FIG. 1 depicts a system with a radio telescope array, according to an example embodiment.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Radio frequency (RF) telescopes have been used for ionospheric measurements almost from their inception. The earliest RF interferometric observations of cosmic radio sources in the 1940s revealed the impact of ionospheric structure at 200 MHz. In the 1960s, observations within several very high frequency bands (30-300 MHz) of bright "radio stars" (technically, a galaxy and a supernova remnant) were used to characterize VHF scintillations. These bright sources may also be referred to as radio sources, radio galaxies, cosmic sources. In general, these naturally occurring sources are attractive beacons for probing the ionosphere since they do not require expensive, space-based transmitter systems and are completely resilient to issues such as space weather and collisions or space debris.

As radio telescopes have continued to expand in size and capabilities, so too has the ionospheric research that has been conducted with them. Methods for self calibration developed in the 1980s were adapted to correct for ionospheric distortions. Observations with the Very Large Array (VLA) at 330 MHz were used to detect and characterize traveling ionospheric disturbances (TIDs). These observations led to the discovery of a previously unknown class of co-rotating plasmapheric disturbances.

Both self-calibration and additional methods for direction-dependent calibration developed in the early 2000s enabled the use of interferometers below 100 MHz that were larger than a few km, i.e., the approximate ionospheric coherence length at these frequencies at mid-latitudes. This allowed for sub-arcminute resolution imaging at these frequencies for the first time, in particular, with the VLA. These new methods in turn led to additional ionospheric disturbance research.

Embodiments are directed to a radio telescope array. When operating at relatively low frequencies (e.g., at approximately 35 MHz), the array includes only a few specially-designed antennas (rather than dozens used for astronomy) and may use the brightest radio sources to characterize an ionospheric structure. This takes advantage of both the increased impact of the ionosphere at lower frequencies and the sources' spectra, which are typically $\propto f^{-\alpha}$ with $\alpha \approx 0.5\text{-}1$. Thus, the array enables completely passive remote sensing of ionospheric irregularities with a low-cost, site-independent, re-locatable platform. For example, material and computing resources may be saved, thereby making the array more efficient, as fewer antennas generate less data to be processed. The array includes custom software that enables the array to resolve and track the apparent motions of radio sources caused by refractive irregularities within the Earth's ionosphere (approximately 100 to 1,000 km altitude). This may be accomplished without the need for beamforming. The array also serves as a functioning telescope suitable for use by amateur radio astronomers and/or students for astronomy purposes, for example, to study bursts of radio emission from the sun and/or other celestial objects (e.g., Jupiter) as well as long-term monitoring of variable radio sources (e.g., Cassiopeia A).

The utility of the radio telescope array will be described through various examples and analysis of several months of data obtained by prototype arrays. The low implementation cost enables deployment of multiple arrays at many locations rather than the veritable handful of much larger low-frequency telescope arrays in operation currently. The radio telescope array described herein may provide valuable information about ionospheric density gradients and scintillations, and is particularly adept at characterizing mid-latitude scintillations, which are usually two weak to detect at higher frequencies. The digital architecture of this array makes it quite adaptable to other novel modes of operation. For instance, the array works with modified GNURadio-based software to record ionospheric reflections of signals from various radio stations at 7.85, 10, and 15 MHz. Thus, this makes the array an excellent platform for student projects and education.

The unique methods for ionospheric remote sensing developed on some of the largest, most sophisticated telescopes in the world have been adapted to work on a substantially more modest platform as descried herein. The radio telescope array enables completely passive characterizations of ionospheric gradients and scattering by km-scale irregularities. These may be accomplished simultaneously along multiple lines of sight 24 hours a day from virtually anywhere in the world. Moreover, the array described herein is capable of sypnotic studies of cosmic source variability that may be conducted contemporaneously with these ionospheric observations.

Example Embodiments

FIG. 1 depicts a system, according to an example embodiment. System 100 may include a radio telescope array and is configured to be used in various applications. System 100 may operate in the frequency range of 20-80 MHz (with a nominal band of 30-40 MHz) and may use time difference of arrival (TDOA) and frequency difference of arrival (FDOA) methods and nonlinear fitting techniques to isolate radio sources on the sky. By monitoring such sources with a relatively wide bandwidth, system 100 may detect intensity and phase fluctuations from ionospheric irregularities with small strength parameters.

System 100 includes a digital backend 102, and an antenna array formed by an antenna 104, an antenna 106, an antenna 108, and an antenna 110, each of which may be coupled to digital backend 102. Each of antennas 104, 106, 108 and 110 may be configured to receive signals from radio sources and to transmit the received signals to digital backend 102. Such radio sources may include exceptionally bright sources of cosmic radio emission, for example, Cassiopeia A (Cas A), Virgo A (Vir A), Taurus A (Tau A), Hercules A (Her A), Hydra A (Hyd A), or Centaurus A (Cen A), the so-called "A-Team." System 100 is configured to track the apparent positions and intensities of the A-Team sources without the need for beam forming to enable measurements of VHF scintillations as well as total electron content (TEC) gradients. Thus, system 100 is optimized to probe ionospheric structure using the A-Team sources.

Digital backend 102 is configured to process data from antennas 104, 106, 108, and 110, as well as to provide power to the antennas. In embodiments, power may alternatively or additionally be supplied to the antennas from one or more separate sources (e.g., batteries).

Antennas 104, 106, 108, and 110 may be configured in various ways and may be separated from one another by a length between 200 and 500 meters. In an embodiment, antenna 104, antenna 106, and antenna 108 may be configured to form an equilateral triangle with antenna 110 being placed at the center of the triangle or thereabout. For example, each side of the triangle may be 350-500 meters in length, and antenna 110 may be separated from the other antennas by 200-290 meters. Such separation or "baselines" are configured to be long enough such that the brightest sources in the sky may be resolved from one another via TDOA with bandwidths on the order of 10 MHz, but are also small enough that the sources themselves appear point-like. Longer baselines may help to suppress extended Galactic emission that acts like a noise source for individual source-based measurements. However, more irregular configurations may be easily accommodated as long as the baselines are within the range of 200-500 m with various baseline orientations. In embodiments, more or fewer than four antennas may be utilized, for example, a pair of antennas forming one baseline.

As shown in FIG. 1, the connection between digital backend 102 and the antennas may be made via low-loss coaxial cables (e.g., cable 114) or similar, such as via radio frequency over fiber technology or wireless technology using free space optical modules with a separate power supply for each antenna. As shown in FIG. 1, the signal path from one or more cosmic transmitters or radio sources to each antenna maybe distorted by ionospheric irregularities 112, and such data may be processed and analyzed by digital backend 102 to passively sense ionospheric irregularities 112. Digital backend 102 may be flexibly configured to allow for alternative processing schemes to support multiple modes of operation. For example, different modes include passive radar using VHF transmitters of opportunity and passive tracking of VHF emitters using time difference of arrival (TDOA) methods.

In an embodiment, each of antennas 104, 106, 108, and 110 may be implemented by VHF antennas that are sky-noise dominated from 20 to 80 MHz, such as the antenna described in U.S. Pat. No. 9,225,074, entitled "Wide-Band Active Antenna System for HF/VHF Radio Reception" by Hicks et al., filed on Nov. 5, 2013, the content of which is incorporated herein by reference in its entirety. Other active VHF antennas may also be utilized in embodiments. Software defined radio technology may be utilized with the antennas along with custom software to track the radio sources.

Figure 2:
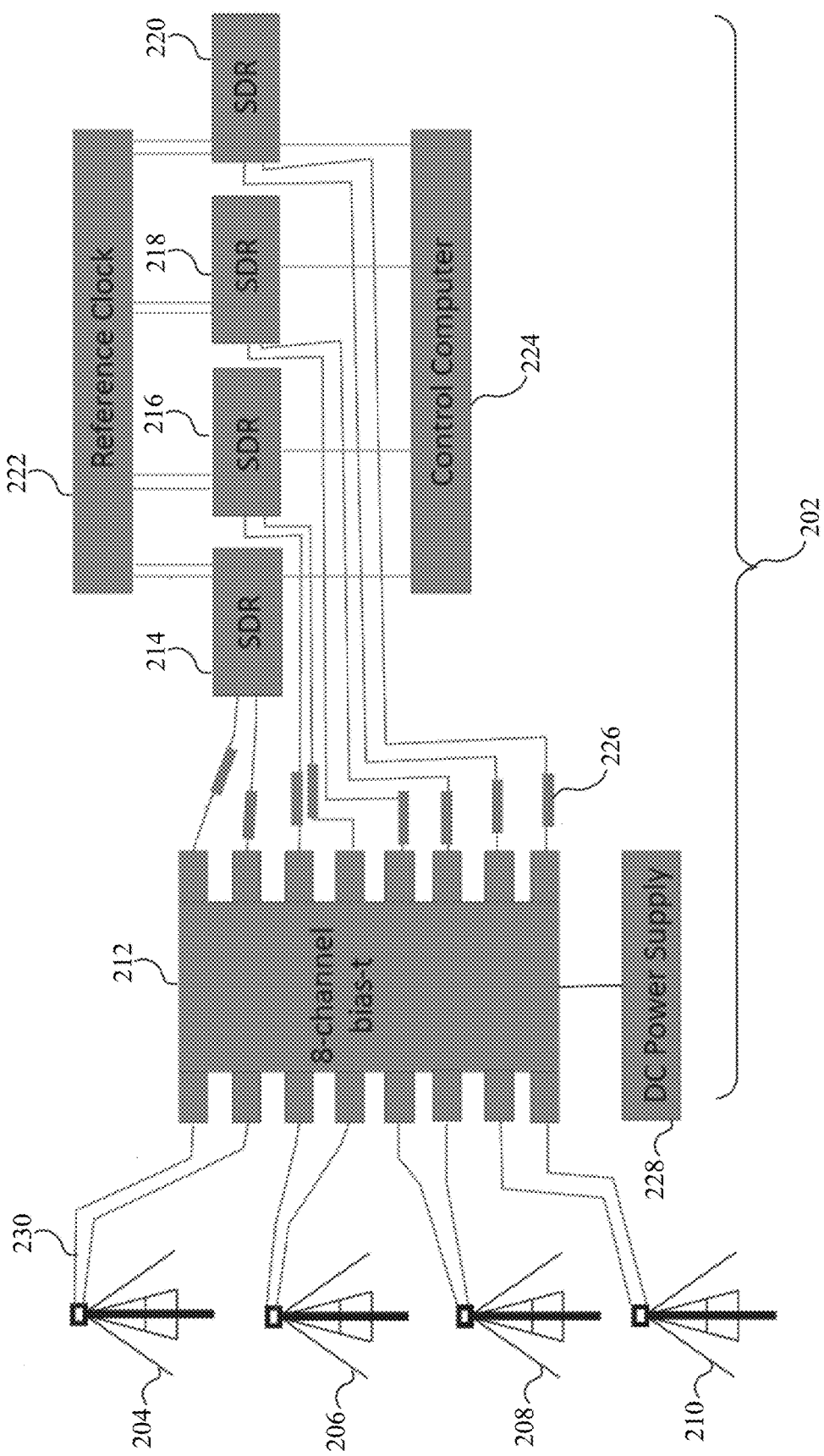
FIG. 2 depicts a system with a radio telescope array, according to an example embodiment.

FIG. 2 depicts a system 200 with a radio telescope array, according to an example embodiment. System 200 may be implemented in various platforms and applications, for example, as an ionospheric density gradiometer. System 200 includes digital backend 202 that includes a bias-t or bias-t unit 212 coupled to a radio telescope array that includes antenna 204, antenna 206, antenna 208, and antenna 210, each of which may have an active balun. Antennas 204, 206, 208, and 210 may be connected to digital backend 202 with low-loss coaxial cables or similar, for example, radio frequency over fiber technology. Each of antennas 204, 206, 208 and 210, may be configured to track a plurality of radio sources (e.g., Cas A, Cyg A) to measure ionospheric gradients and scintillations. In an embodiment, bias-t unit 212 may be configured as a network for setting the direct current (DC) bias point for some electronic components without disturbing other components in system 300. Bias-t unit 212 may be coupled to a direct current power supply 228, which may provide power to the antennas. If the antennas include their own power supply, then power supply 228 may not be necessary. Bias-t unit 212 may be communicatively coupled to software defined radios (SDR) 214, 216, 218 and 220. In an embodiment, the number of antennas corresponds to the number of SDR needed for system 200. SDRs 214, 216, 218, and 220 may all be connected to reference clock 222 and control computer 224. Each SDR is a radio communication system in which components that have been traditionally implemented in hardware (e.g., mixers, filters, amplifiers, modulators/demodulators, detectors, etc.) may be implemented by software on a computer (e.g., computer 224) or an embedded processing system.

In an embodiment, antennas 204, 206, 208, and 210 may be implemented by inverted vee dipole antennas that use active baluns to maintain sky noise dominance (6 dB or more) over the 20-80 MHz range. These antennas may have multiple purpose, for example, they may be utilized in a Long Wavelength Array (LWA) or may be used as part of individual standalone receivers (e.g., for solar burst monitoring) and larger systems. However, in this embodiment, the configuration of the antennas is designed for effective remote sensing of ionospheric gradients using A-Team sources at about 35 MHz. Similar to system 100, the antennas in FIG. 2 may be separated from one another by a length between 200-500 meters. At such length, the brightest sources in the sky may be resolved from one another via TDOA with bandwidths on the order of 10 MHz while the sources themselves appear point-like.

The radio telescope array described herein has been transitioned to the real world as prototype arrays in Maryland and New Mexico, dubbed the Deployable Low-band Ionosphere and Transient Experiment (DLITE). The prototype arrays have been used to collect several months of data to test the systems and methods described herein. One array, named DLITE-NM (located at 34.1° N, 107.7° W), has been configured using antennas at the site of the LWA1 array using existing antennas that were spread out on baselines of a few hundred meters. The other array has been established in southern Maryland near Pomonkey (located at 38.6° N, 77.1° W), named DLITE-POM, and has baselines of about 350 m north/south and 420 m east/west. The results from the two prototype arrays are described below in conjunction with various figures.

The DLITE system is a four-element interferometric radio telescope that includes commercial off-the-shelf parts to minimize costs and maximize ease of deployment. The system operates in the high frequency and very high frequency regimes, nominally in a 30-40 MHz band, but with good sensitivity (sky-noise dominated) in the 20-80 MHz range. Its configuration is optimized to probe ionospheric structure using the A-Team sources.

To sufficiently characterize ionospheric gradients, a phase precision that is equivalent to a differential total electron content (TEC) of 0.001 TECU or better is desirable (1 TECU=$10^{16}$e$^-$m$^{-2}$). For a single baseline, the difference in TEC between the two antennas' lines of sight produces a phase differential given by $$\Delta\phi = 8436\left(\frac{f}{1\,\text{MHz}}\right)^{-1}\left(\frac{\Delta TEC}{1\,TECU}\right) \text{radians} \quad (1)$$

The phase precision is ≅(S/N)$^{-1}$, implying that at, e.g., 35 MHz, only S/N>4 is required. However, in practice, to unwrap phases without artificial jumps, S/N>5 may be needed.

For a single baseline, S/N=I(f)SEFD$^{-1}\sqrt{\Delta f \Delta t}$, where I(f) is the intensity at frequency f, $\Delta f$ is the bandwidth, $\Delta t$ is the coherent integration time, and SEFD is the system equivalent flux density, which is a combination of system noise and antenna collecting area. For a single LWA antenna, the SEFD is fairly independent of frequency and ≅2×10$^6$ Jy; 1 Jy=10$^{-26}$Wm$^{-2}$Hz$^{-1}$. According to spectral analysis of VLA data, the dominant oscillation periods for fine-scale/small-amplitude fluctuations are around a few minutes, implying $\Delta t \leq 60$ s is desirable. For a bandwidth of 8.33 MHz, this implies that sources that are at least 450 Jy are required. At 35 MHz, this includes Cyg A (22×10$^3$ Jy), Cas A (22×10$^3$ Jy), Vir A (3.7×10$^3$ Jy), Tau A (2.4×10$^3$ Jy), Her A (1.8×10$^3$), Hyd A (1.0×10$^3$ Jy), and Cen A (1.5×10$^3$ Jy), the A-Team. From the northern hemisphere at mid-latitudes, 2-4 of these six sources are above an elevation of 20° at any given time, giving 24-hour coverage with multiple lines of sight. Detailed sky models for the four brightest among these sources in the 30-77 MHz range have been derived using the Low Frequency array (LOFAR).

For a baseline of length B, the effective resolution on the sky using TDOA is c($\Delta fB$)$^{-1}$ radians in the direction parallel to the baseline, where c is the speed of light. Among the seven A-Team sources listed above, the minimum separation on the sky is 20°. For a bandwidth of 8.33 MHz and a baseline of 200 m, the corresponding resolution of about 10° may be sufficient. However, in the direction perpendicular to the baseline, there is no TDOA resolution. Thus, as stated above, a variety of baseline orientations may be utilized to ensure that the A-Team sources may be adequately separated from one another at all times. Three antennas may provide the bare minimum to achieve this. However, a well-placed fourth antenna may double the number and variety of baselines without substantially adding to the system complexity.

For example, as shown in FIG. 2, the signal path starts with signals from antennas 204, 206, 208 and 210, each of which has two sets of dipoles oriented north/south (X polarization) and east/west (Y polarization). The antennas may be aligned within a few degrees of one another to ensure that the same polarization is correlated between pairs of antennas. For example, this may be sufficiently accomplished using a compass or a compass application on a smart phone. The signal from each polarization may be transmitted down a low-loss coaxial cable, such as cable 330, (e.g., LMR-400-DB manufactured by Times Microwave Systems®). The cables may be directly buried without a conduit (hence the DB designation for the LMR-400-DB cable). However, these cables may be too thick to bend into the antenna masts to connect to the active baluns at the top of the antennas, thus short segments of higher-loss cable, (e.g., LMR-240-DB manufactured by Times Microwave Systems®), may be utilized near the antennas. Since sky noise increases substantially at lower frequencies ($T_{sky} \propto f^{-2.55}$, approximately), the LMR-400-DB cable may be utilized to maintain sky noise dominance for frequencies around 50 MHz or above for the long (e.g., several hundred meters) cable runs. At about 50 MHz or below, the higher-loss LMR-240 (by approximately 2-3 DB per 100 m) may be utilized for the entire cable run.

At the other end, the coaxial cables may be connected to adapters that output the signals over SMA (subminiature version A) cables to bias-t unit 212. Bias-t unit 212 is configured to pass the signals through to the SDRs as well as to transmit direct current (e.g., 15 VDC) over the coaxial cables back to the antennas to power the active baluns. Bias-t unit 212 may be a commercial off-the-shelf (COTS) component or it may be custom made. As shown in FIG. 2, bias-t unit 212 includes 8 input ports, two of which are coupled to a single antenna, and 8 output ports, two of which are coupled to a single SDR. SDRs 214, 216, 218 and 220 may be a COTS component, such as USRP N210 radios manufactured by Ettus Research®, that may be synched to a common pulse per second (PPS) and 10 MHz frequency reference clock 222 (e.g., Ettus OctoClock-G manufactured by Ettus Research®). Clock 222 may be synched to GPS time, but this is not required. To access the optimum frequency regime for antennas 204, 206, 208, and 210, daughter boards (e.g., BasicRX Daugtherboard 1-250 MHz Rx manufactured by Ettus Research®) within the N210 radios may be used to output signals from 1-250 MHz. In an embodiment, because the analog-to-digital (A/D) converter utilized in digital backend 220 samples at 100 Mbps, a filter (e.g., filter 326) may be applied at each output of bias-t unit 212 to prevent aliasing of unwanted signals. For example, filter 226 may be a low-pass filter with a cutoff at 50 MHz (e.g., SLP-50+ manufactured by Mini-Circuits®), although other SMA-connected filters may easily be incorporated into system 200 or not utilized depending on the configuration of system 200 and/or its components.

In an embodiment, both outputs from each antenna may be connected to one SDR. In this mode, the maximum bandwidth in 16-bit mode is 12.5 MHz. The higher bit rate allows for better dynamic range in the presence of strong radio frequency interference (RFI). In another embodiment, an 8-bit mode may be utilized that may double the bandwidth. In operation, the bandwidth may be limited by the speed of processing.

The SDRs may be connected to computer 224 via suitable means, such as Ethernet cables to a PCIe, four-port gigabit LAN card. Computer 224 may be a personal computer or a specialized computer that is adequate for processing data as described herein. For example, in an embodiment, computer 224 may have the following specifications, Intel Core i7-6700, eight-core central processing unit (CPU) (3.4 GHz), 64 GB of RAM, and a SATA hard drive. Computer 224 is configured to run a "correlator," a component that performs cross correlations among pairs of antennas within an interferometer. Such a correlator may be one of several types of hardware and/or software based systems.

Figure 3:
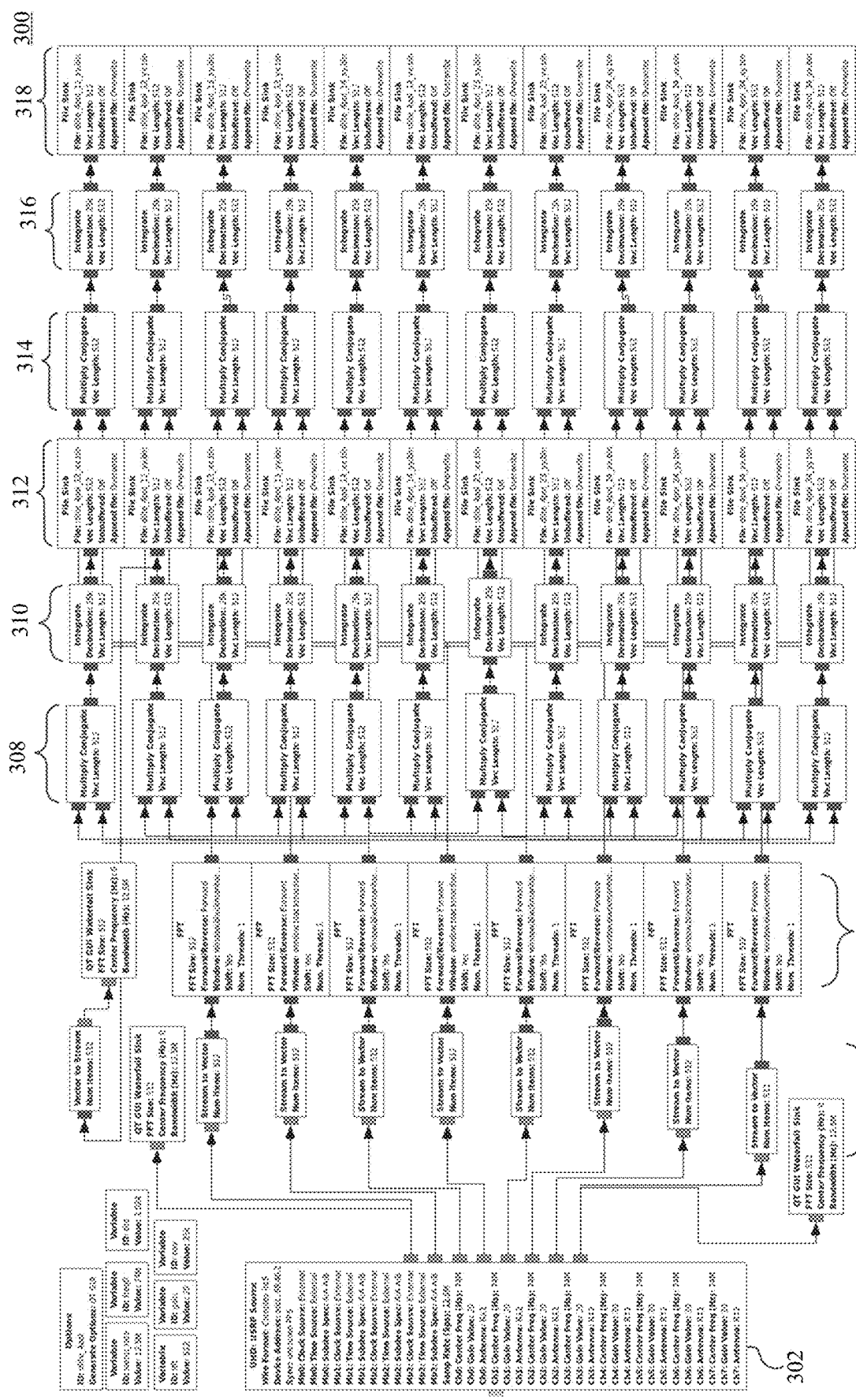
FIG. 3 depicts a flowchart for a correlator, according to an example embodiment.

For example, FIG. 3 depicts a flowchart 300 for a correlator, according to an example embodiment. The correlator is a processing system that cross-correlates signals from each unique pair of antennas within an interferometer. These cross correlations may then be utilized to generate images of the sky and/or utilized to measure changes in intensity and phase of radio sources due to ionospheric variations. In embodiments where the baselines are not exceedingly long, the differential delays among antennas, even with unequal cable lengths, may be small enough that the signals do not need to be digitally delayed before cross-correlation. Thus, the correlator may be relatively simple to implement.

The correlator may be written using the GNU Radio framework to facilitate direct interaction with the SDRs (e.g., SDRs 214, 216, 218 and 220 shown in FIG. 2). FIG. 3 shows the correlator generated with the GNU Radio Companion GUI. In an embodiment, the correlator may be an interactive version that outputs a real-time waterfall plot from two of the antennas (e.g., antennas 204, 206, 208 or 210 shown in FIG. 2). In another embodiment, the correlator may be a non-interactive version that runs autonomously, not necessarily in real time. As shown in FIG. 3, a first block 302 may be a source block that treats the four SDRs with two inputs each as a single, eight-channel receiver. As shown in block 302, the clock and frequency reference sources may be set to "external," signaling the SDRs to use the external reference signals from reference clock 222 for synchronization. The output from each of the eight channels may be converted to a complex vector with a length equal to the number of frequency channels desired in the output (e.g., 512 shown in FIG. 3) as shown in block 304. Each vector may be fast Fourier transformed (FFTed) as shown in block 306, with a Blackman-Harris window, for example. For each unique pair of antenna, the output of the FFT from one antenna may be multiplied by the complex conjugate of the other per frequency channel, and these may be coherently integrated over a chosen $\Delta t$ (e.g., 1.024 s). After each $\Delta t$, the complex correlation, or "visibilities" may be written to files as unformatted 32-bit binary data. This may be performed per polarization. For example, block 308 shows the multiplication of the same polarization from each pair of antennas (XX or YY), totaling 12 entries. Block 310 shows the integration of the output of block 308, and 312 shows the visibilities being written to files. The file name indicates the antennas and polarization (e.g., dlite_4pol_23_yy.bin is for antennas 2 and 3, Y-polarization). If full polarization is desired, cross polarization products may be generated as well (i.e., X-pol. times Y-pol., and vice versa). For example, block 314, block 316, and block 318 are similar to blocks 308, 310, and 312, respectively for cross polarizations.

After assembling the correlator within the GNURadio Companion environment, a Python® file generated may be modified into an operational version. This correlator may read in a text configuration file that specifies $\Delta f$, number of output frequency channels, central frequency, $\Delta t$, duration, number of output polarization products (two or four), data output directory, and gain. The duration may be managed with the Python® time command. The ratio of the A/D converter sampling rate, 100 Mbps, to $\Delta f$ should be an even integer for the N210 radios to work properly. For normal daily operations of a system, e.g., system 300, a nominal configuration file may have $\Delta f=100\times10^6/12=8.33\times10^6$ Hz, number of channels is 512, central frequency is $35\times10^6$ Hz, duration is 86,164 s (one sidereal day), two polarization products (XX and YY), and gain=20 dB. In embodiments with two output polarization products, the correlator may keep up with influx of data with the bandwidth set at 8.33 MHz or less. In other embodiments, 10 MHz may be feasible, although at this level or higher, the correlator may drop an excessive number of packets to the point that full time steps may be lost. For full polarization (XX, YY, and XY, and YX), the bandwidth may be set at 6.25 MHz or less to avoid excess packet loss. At the 8.33 MHz setting, the correlator may use 80-85% of the CPU (e.g., of control computer 324 shown in FIG. 3) capacity, which may be spread evenly among the eight cores by GNURadio via multi-threading. The memory usage may be approximately 1.5-1.6 GB (out of the 64 GB available). Thus, the bandwidth may be limited by the CPU rather than memory or disk writing speed.

In practice, the correlator may run automatically in the dual polarization, 8.33 MHz bandwidth configuration every day, starting at 00 Universal Time (UT) via a cronjob, a software time-based job scheduler that enables jobs to be run periodically at fixed times, dates, or intervals. Time may be left at the end of the UT day to run a script (e.g., Python®) that reads in all the visibilities or visibility data and flags times and/or frequencies with anomalously large amplitudes. All frequency channels for any time step where a large number of channels were flagged in this process may also be flagged. For example, if more than ~25-30 channels out of 512 are flagged, the entire time step may be considered bad. Following this, data may be averaged down to a temporal resolution, for example, around 1 minute (59 time steps) and to 64 frequency channels, excluding the flagged data while the unflagged data may be used. For any such interval (i.e., ~1 minute), if more than half the data were flagged, the averaged data for that interval are set to zeros. Diagnostic waterfall plots of amplitudes and phase may be made from these averaged data and automatically provided (e.g., emailed) for daily inspection.

Figures 4, 5:
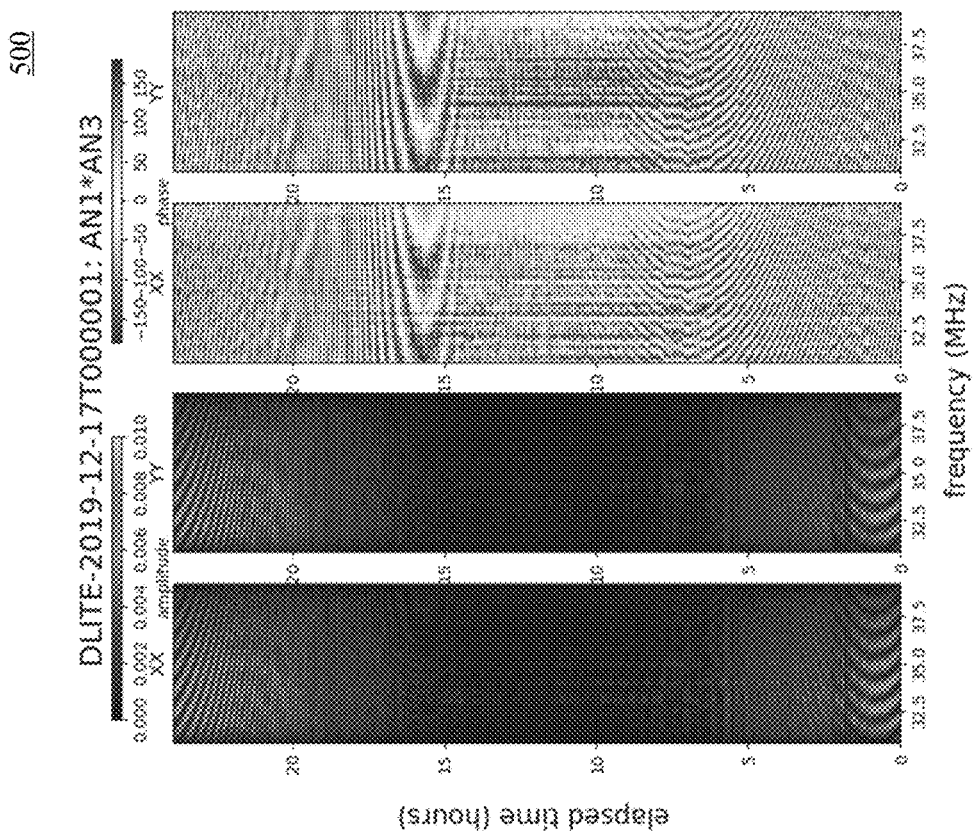
FIG. 4 depicts example diagnostic plots of amplitude and phase as functions of frequency and time from a baseline.
FIG. 5 depicts example diagnostic plots of amplitude and phase as functions of frequency and time from a baseline in New Mexico.

For example, FIGS. 4 and 5 depict diagnostic plots of amplitude and phase as functions of frequency and time from baselines of DLITE systems in Maryland and New Mexico, respectively. In particular, FIG. 4 shows diagnostic plots from a ~350-m north/south baseline in southern Maryland, and FIG. 5 shows diagnostic plots from a ~460-m east/west baseline in western/central New Mexico (more detail on these arrays will be described below). It is possible to see the interference pattern between Cyg A and Cas A in both amplitude and phase along with some occasional broadband interference, likely from nearby power lines. A few flagged time steps and time/frequency pixels are also apparent (blanked in white, for example, shown as 402 in FIG. 4). The fringes of the interference pattern are closer together in FIG. 5 because the baseline is longer. In embodiments, visibilities from all six unique baselines are the primary data products generated by the system (e.g., system 200 of FIG. 2) and used for analysis methods, which will be described in detail below.

Figure 6:
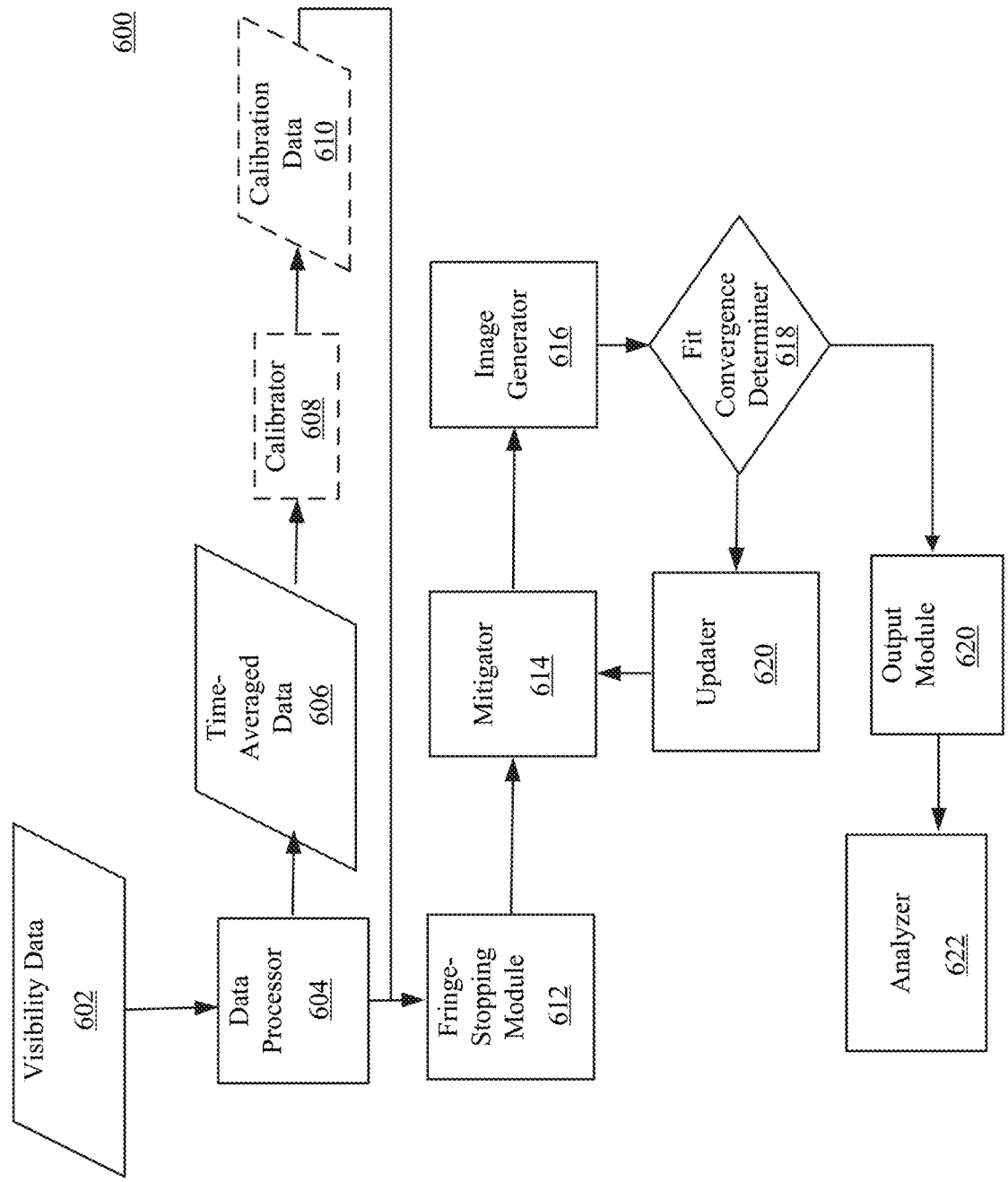
FIG. 6 is a block diagram of an ionospheric density gradiometer, according to an example embodiment.

FIG. 6 is a block diagram of an ionospheric density gradiometer 600, according to an example embodiment. Gradiometer 600 may be implemented as system 100 or 200, for example. Gradiometer 600 is configured to collect visibility data and analyze such data to generate ionosphere analysis data, from which ionospheric gradients and scintillation indices may be determined. Gradiometer 600 may include a data processor 604 configured to process visibility data 602 from a correlator, a fringe-stopping module 612, a mitigator 614, an image generator 616, a fit convergence determiner 618, an updater 620, an output module 620, and an analyzer 622. Gradiometer may also include calibrator 608 configured to generate calibration data 610, although the calibration operation may occur periodically rather than continuously during operation of gradiometer 600. Gradiometer 600 may include more or fewer components than shown in FIG. 6, and the components may be implemented in hardware or a combination of hardware and software, for example, by a digital backend.

Figure 7:
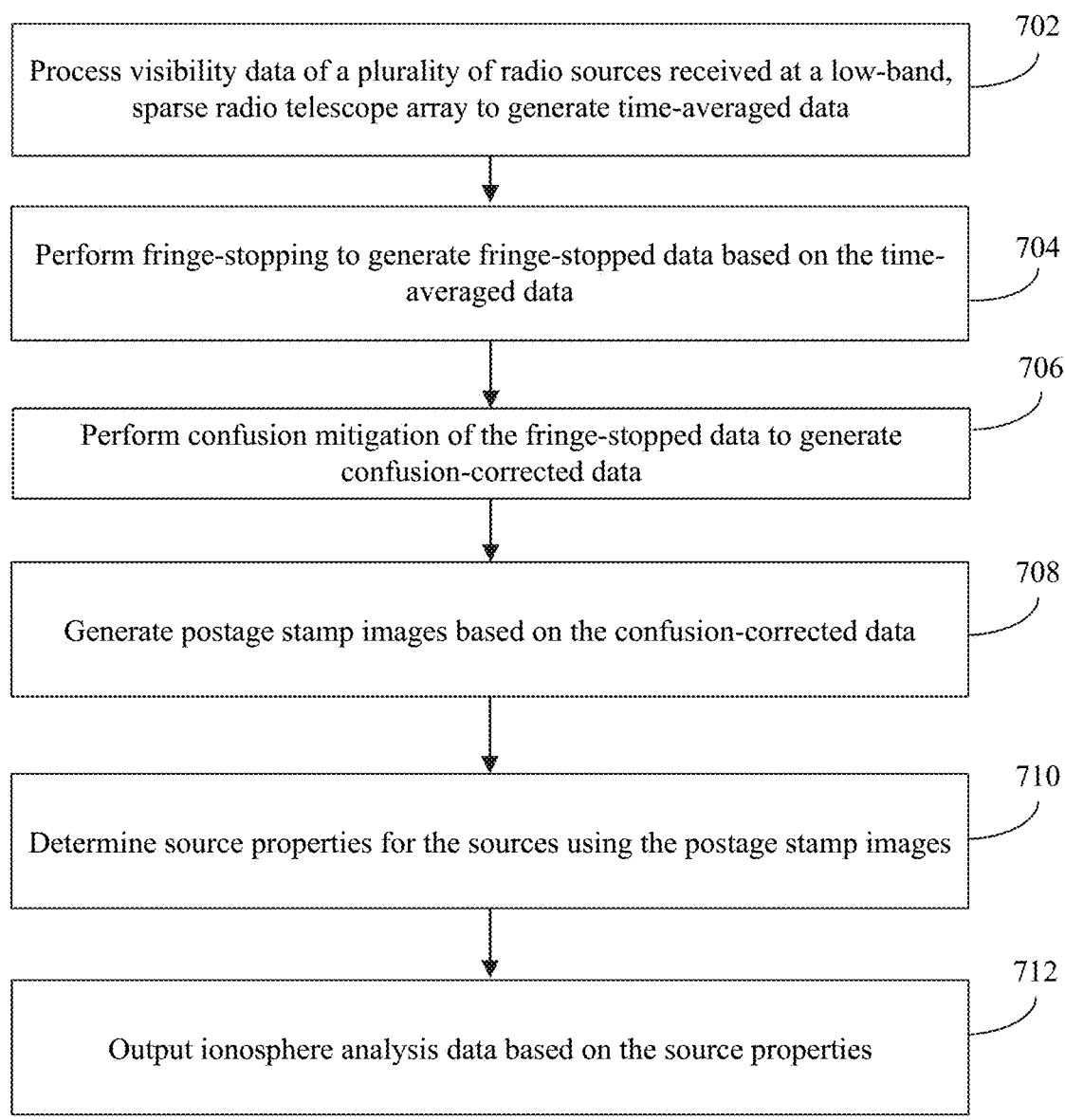
FIG. 7 depicts a flow chart for a method for analyzing ionospheric data, according to an example embodiment.

Ionospheric data may be analyzed in many ways. For instance, FIG. 7 depicts a flowchart 700 for a method of analyzing ionospheric data, according to an example embodiment. Flowchart 700 may be implemented with any radio telescope array and/or system described herein (e.g., systems 100, 200 or 600 respectively shown in FIGS. 1, 2, and 6). However, the method of flowchart 700 is not limited to these embodiments. This method extracts information about changes in intensity and phase of radio sources due to ionospheric structures. This method produces an output, ionosphere analysis data, which may be utilized as an input to an imaging process, such as the method shown in FIG. 14, to correct for gain variations caused by the ionosphere.

Low-frequency radio telescope arrays may be effectively used as ionospheric density gradiometers, such as gradiometer 600 shown in FIG. 6. For a relatively compact array, gradients in the slant TEC perpendicular to the line of sight toward a cosmic radio source, $\vec{\nabla}\text{TEC}$, may cause the apparent position of the source to change by an amount $\vec{\delta\theta}$ according to $$\vec{\nabla}TEC = 1.20 \times 10^{-4}\left(\frac{f}{100\,\text{MHz}}\right)^2\left(\frac{\vec{\delta\theta}}{1''}\right) TECU\,\text{km}^{-1} \quad (2)$$

Consequently, one TEC gradiometer approach is to make images of relatively bright sources with known positions on short time scales (e.g., approximately 1-2 minutes) and measure their apparent positions, yielding measurements of $\vec{\delta\theta}$.

As mentioned, the A-Team sources may be resolved from one another in TDOA with baselines that are approximately 200 m or longer for the nominal bandwidth of 8.33 MHz. However, the projection of TDOA on the sky may provide resolution in one direction. In other words, a single baseline acts like a fan beam that is $c(\Delta fB)^{-1}$ radians wide in the direction parallel to the baseline. Thus, from a particular location, two A-Team sources may not be sufficiently isolated from one another on all baselines for some local sidereal times (LSTs; the sky looks the same at a fixed LST from a fixed location). The limitations inherent to the TDOA/fan-beam approach may be overcome by analyzing multiple baselines simultaneously. With a variety of baseline orientations, there is enough information available to disentangle the sources and extract their apparent positions and intensities. To achieve this, the method shown in FIG. 7 may be utilized. This method uses an ad hoc gradient search that uses small "postage stamp" images around each source as a proxy for the likelihood surface.

Flowchart 700 may include other steps not shown in FIG. 7. In embodiments, more or fewer steps of flowchart 700 may be performed. The method of FIG. 7 may be performed with a particular amount of data (e.g., a full day or one hour) or may be performed in real-time. Flowchart 700 will be described in reference to gradiometer 600.

Flowchart 700 begins with step 702, in which visibility data of a plurality of radio sources received at a low-band, sparse radio telescope array is processed to generate time-averaged data. The processing of visibility data may include any of collecting the visibility from a correlator, flagging spurious visibility data such that they may be excluded from analysis, averaging unflagged visibility data to generate the time-averaged data; and outputting the time-averaged data and timestamps to a file.

For example, the visibility data may be received at data processor 604 from a correlator, such as correlator 300 shown in FIG. 3. In an embodiment, the visibility data may be collected from a plurality of radio sources and received at a system (e.g., the systems shown in FIG. 1, 2, or 6) that includes a radio telescope array. Visibility data may include time series of the apparent intensities of one or more bright radio sources, such as the A-Team sources. In an embodiment, this may be accomplished using the approximate LWA antenna pattern and the known positions of these sources on the sky. However, D-region absorption and/or scintillation events may cause significant deviations from this scenario. Additionally, the observed intensity may vary from one baseline to another, especially when different cable lengths are used. These deviations may be accounted for and/or mitigated in the subsequent steps.

While not shown in FIG. 7, flowchart 700 may further include calibrating the time-averaged data to generate calibration data. For example, this calibration step may be performed by calibrator 608, shown in FIG. 6, on a continuous or a periodic basis (such as once or twice a day based on the desired accuracy and/or other requirements). The calibration step may include collecting time-averaged data, timestamps, and approximate antenna positions of the sparse radio telescope array; determining model visibilities for the sources; based on the model visibilities, refining the approximate antenna positions and determining cable delays. The calibration data that includes the refined approximate antenna positions and cable delays may be outputted to a component (e.g., fringe-stopping module 612 of FIG. 6) or may be written to a file to be used by another process, etc.

When the positions of the antennas used for a system are already well known, infrequent or no calibration may be needed. However, when an array is newly installed, smartphone-based or other forms of measurement of the antenna positions may not be adequately accurate. In this case, it is possible to follow a procedure for simultaneously determining antenna positions and differential cable delays using the expected combined visibilities for the three A-Team sources, for example, Cyg A, Cas A, and Vir A. Using the latitude and longitude of a reference antenna, the sky positions of these sources may be calculated (e.g., with the Astropy Python® package available at https://www.astropy.org) and combined with the approximate antenna response to compute a full (sidereal) day of model visibilities for an assumed relative antenna position and cable delay. These may then be used as matched filters and applied to the observed visibilities for each baseline that included the reference antenna. The matched-filter amplitude as a function of east/west and north/south position and cable delay may then be used to measure the antenna position and cable delay relative to the reference antenna. In an embodiment, there may be a degeneracy between north/south and vertical position and it may be best to leave the vertical positions of the antennas fixed. This calibration method may be applied on a periodic basis (e.g., daily) to provide antenna positions and/or to refine antenna positions and determine cable delays to provide better data collection. While the actual positions of the antennas may not change appreciably from one calibration to the next, adopting the best-fitting antenna positions periodically may help account for any bulk ionospheric distortions in the appearance of the sky over the calibration period (e.g., over a full sidereal day).

In step 704, fringe-stopping is performed to generate fringe-stopped data based on the time-averaged data. For example, fringe-stopping may be performed by fringe stopping module 612 shown in FIG. 6, and may include obtaining the time-averaged data, timestamps, and calibration data. At each time step, the associated visibility data for an expected time difference of arrival per source may be corrected to generate corrected visibility data. Then, all corrected visibility data may be averaged over all frequencies per baseline. The averaged, corrected visibility data may be used to generate normalized visibility data to remove any bulk complex gain offsets among all baselines.

Visibility data may be fringe-stopped to generate estimates for each radio source. In other words, at each time step, the visibilities may be corrected for the expected TDOA per source, and then averaged over frequency per baseline. To remove any bulk complex gain offsets among the baselines, the visibilities may be divided by the mean visibility calculated over times when the source is above 20° elevation. The normalized fringe-stopped visibilities may then be smoothed with a predetermined window (e.g., ten minutes or one-hour) that is sufficient to remove contamination from one source within another source's visibilities. The amplitudes of these smooth data may then be used for the intensity estimates.

In step 706, confusion mitigation of the fringe-stopped data is performed to generate confusion-corrected data. For example, confusion mitigation may be performed by mitigator 614 shown in FIG. 6. Confusion mitigation may include determining initial intensity estimates for the sources based on amplitudes of the fringe-stopped data. Then, for each source, generate a first model of fringe-stopped visibility data for that source and baseline based on the initial intensity estimates, known source positions, and calibration data and generate a second model of residual visibility data from other sources (i.e., attributable to other sources) including non-fringing sources (e.g., power lines). The first model and the second model may be normalized. A fitting process may be performed to fit a linear combination of the normalized first model and second model to the visibility data of that source while subtracting the contribution from the other sources to generate the confusion-corrected data for that source.

For example, for each source, a model of the residual visibilities from all other sources that remain after applying fringe stopping is computed to account for cross contamination, or "confusion." This includes any additional "source" that does not fringe (i.e., a non-fringing source) to allow for stationary sources of human-made, broadband interference (e.g., power-line noise). These are normalized by dividing by the mean fringe-stopped visibility (again, for elevation greater than 20°). A linear combination of these models is fit to each source visibility, and then the contribution from the other sources may be subtracted.

In step 708, postage stamp images may be generated based on the confusion-corrected data. For example, this step may be performed by image generator 616. This step may include applying complex gain correction by dividing each baseline by an average of confusion corrected data for the sources and generating the postage stamp images by forming a postage stamp around each source based on all baselines. The postage stamp images may be utilized to determine an apparent position and apparent amplitude for each source.

For instance, the baselines may be combined in a standard way to form a postage stamp image of the source at a predefined time interval (e.g., approximately 1 minute in length). In this case, the resolution is $\cong\lambda/\beta_{max}$ radians. The images may be produced in orthographic projection using the direction cosines l=cos e sin a and m=cos e cos a, where e is elevation and a is azimuth (clockwise from north).

In step 710, source properties may be determined for the sources using the postage stamp images. For example, this step may also be performed by fit convergence determiner 618. For example, step 710 may include comparing the apparent position and apparent amplitude and the position and amplitude from the previous iteration for each source to determine fit convergence. A convergence criterion may be that the positions and amplitudes differ on average from those of the pervious iteration by less than a chosen amount (for example, 0.001%). Upon determining that there is fit convergence, based on the convergence criterion for example, setting the apparent position and apparent amplitude as a final position and final amplitude, and based thereon, determining final source position offset for each source. The source properties, e.g., final source position offset, the initial position and the initial amplitude for each source along with timestamps may be provided as an output, from which ionosphere analysis data may be derived.

If there is no fit convergence (e.g., the convergence criterion not being met), then the source properties may be updated by updater 620, for example. For instance, the updating process may include updating the measured amplitude and position of each source from the previous iteration based on the postage stamp images generated in the current iteration. This may be done, for example, using a loop gain, $G_L$, to control how quickly or slowly the fit converges. The positions and amplitudes may be updated as $l \rightarrow l+G_L \Delta l$, $m \rightarrow m+G_L \Delta m$, and $A \rightarrow A(1-G_L)+G_L \Delta A$, where l, m, and A are the positions and amplitude from the previous iterations and $\Delta l$, $\Delta m$, and $\Delta A$ are the differences in the positions and amplitude between the previous and current iteration. The fringe-stopped visibilities may then be remade based on the updated data. Steps 706 and 708 may be repeated until there is convergence or for a predefined number of iterations.

In step 712, ionosphere analysis data based on the source properties may be outputted. For example, analyzer 622 shown in FIG. 6, may perform this step. For instance, analyzer 622 may analyze source properties and/or derive further information based on the source properties. In an embodiment, the final position offsets of the sources may be converted to gradients in ionospheric total electron content. In another embodiment, scintillation indices maybe measured based on the final amplitudes and position offsets of the sources.

Figure 8:
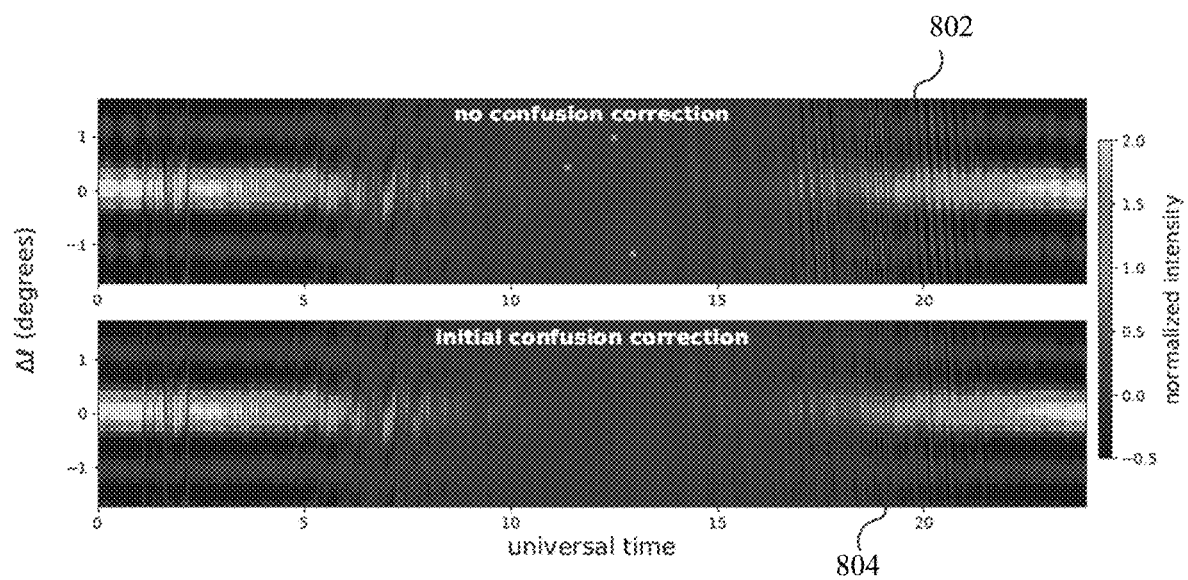
FIG. 8 illustrates an east/west slice through a postage stamp image cube for Cassiopeia A.

FIGS. 8-12 illustrate the different stages of the gradiometer analysis using data from the DLITE system in New Mexico. For example, FIG. 8 illustrates an east/west slice through a postage stamp image cube for Cas A (X polarization) based on data collected in New Mexico on Dec. 17, 2019. The different stages of a gradiometer analysis of that data is shown in FIG. 8. Upper panel 802 shows the result when there is no correction made for confusion from other sources, and bottom panel 804 shows a confusion-corrected result using nominal models for the other A-Team sources. Wave-like artifacts from about 17-22 UT may be seen in upper panel 802, which may be greatly mitigated by subtracting the model for source confusion. There are also relatively consistent artifacts at ±0.8° and +1.2°, which are negative and positive sidelobes within the synthesize beam of the four-element array of the radio telescope. Significant changes in intensity and $\Delta l$ due to ionospheric activity may also be seen.

Figure 9:
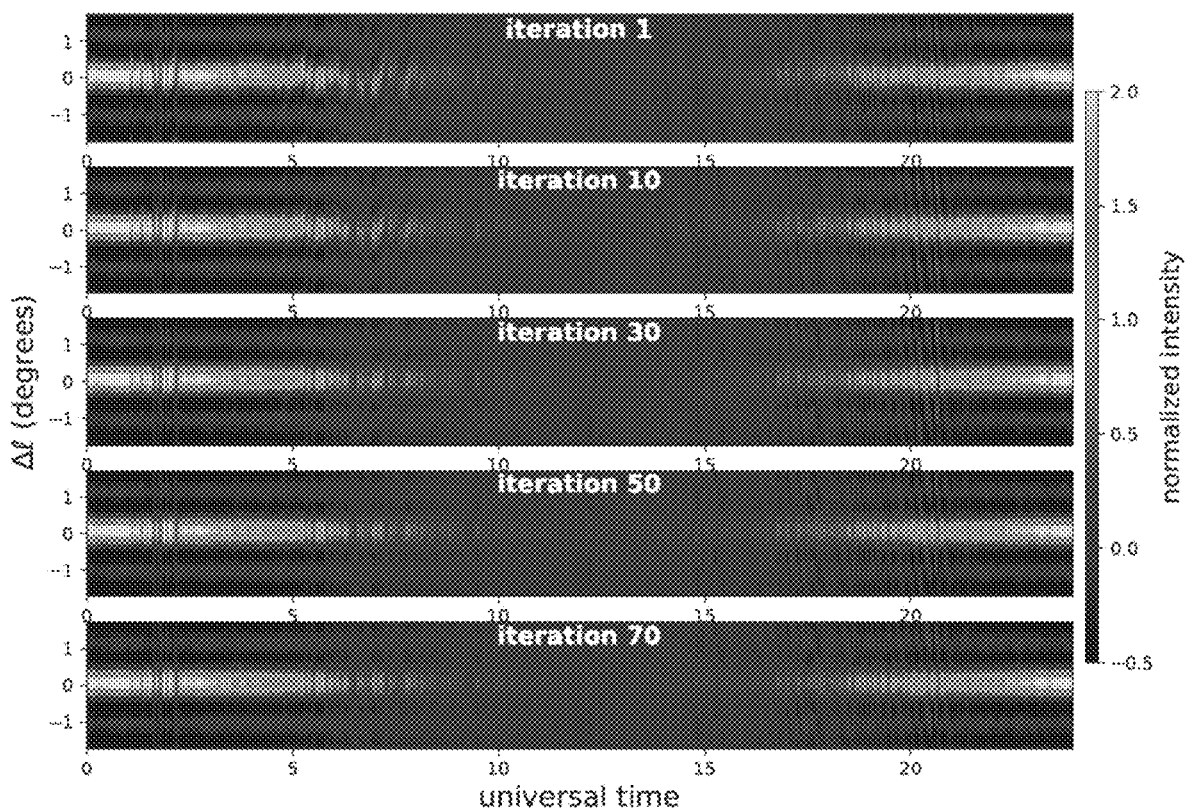
FIG. 9 illustrates the east/west slice shown in FIG. 8 at progressive stages in an iterative fitting process.

FIG. 9 illustrates the same east/west slice shown in FIG. 8 at progressive stages in the iterative fitting process. That is, FIG. 9 depicts the slice at different iterations within the gradient search fitting process with $G_L=0.05$. Since the postage stamp images are made relative to the updated apparent source position, the visible offsets in $\Delta l$ gradually disappear as the algorithm (e.g., as shown in FIG. 7) appears to converge between iterations 50 and 70. The confusion artifacts between 17 and 22 UT also appear to improve due to updates to the positions and intensities of all sources at each iteration.

Figure 10:
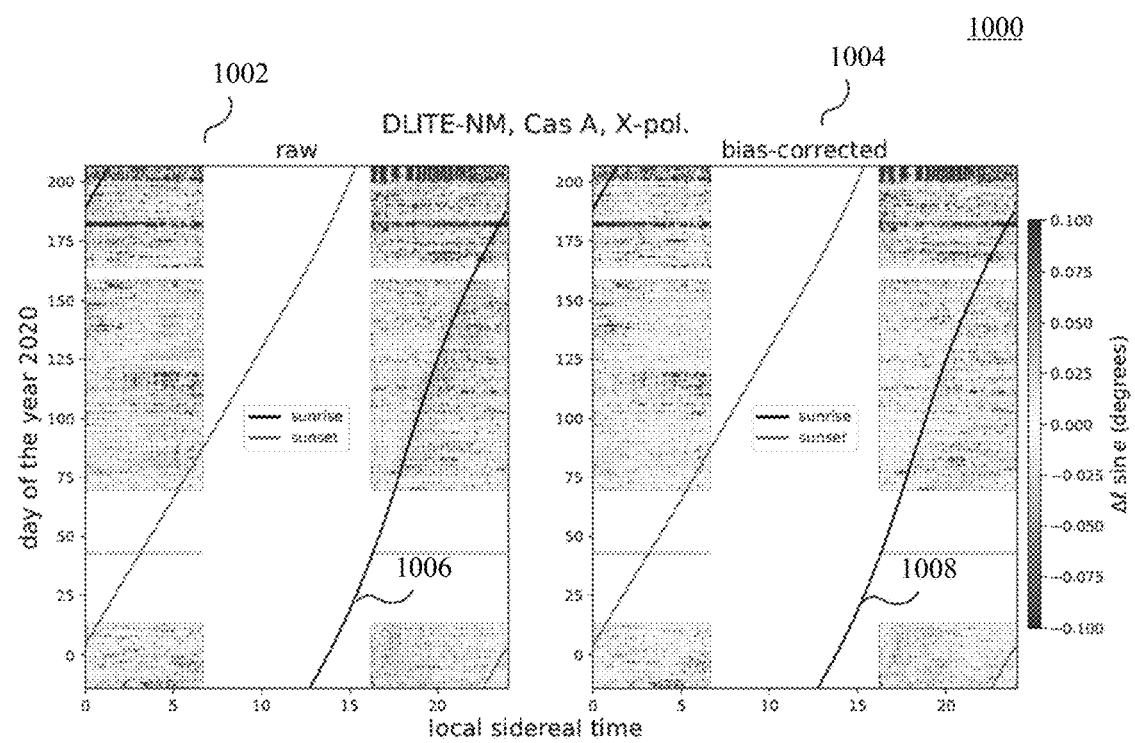
FIG. 10 depicts plots of east/west position offsets for Cassiopeia A as a function of local sidereal time and day of the year from a system in New Mexico.

Despite steps taken to mitigate the impact of confusion on source position offset measurements, there may be times when these issues persist at low level. For example, FIG. 10 depicts plots of east/west position offsets for Cas A as a function of LST and day of the year from the DLITE system in New Mexico. Left panel 1002 shows these offsets with no bias correction, and right panel 1004 shows the results after subtracting the median over all dates within each LST bin. FIG. 10 shows $\Delta l$ values measured toward Cas A from several months of data. While there are a few aberrant dates that were severely impacted by RFI, most show a reasonable amount of ionospheric activity with a repeatable signature of gradient changes at sunrise (black curves 1006 and 1008). However, confusion artifacts that repeat with LST are still present at low level (e.g., ~0.02°; 0.001 TECU km$^{-1}$ equivalent) after LST-16 due mostly to confusion with Vir A. There is also a more subtle repeatable pattern that results from small errors in array calibration. With a large amount of data spanning many times of year, these patterns that repeat with LST may be determined and corrected for without impacting real ionospheric diurnal variations. This may be done effectively by calculating the median at each LST (i.e., along the ordinate in FIG. 10). A bias-corrected image of $\Delta l$ using the median per LST is shown in right panel 1004. For the vast majority of the time, this is quite effective at mitigating the remaining effects of source confusion and calibration errors.

Figure 11:
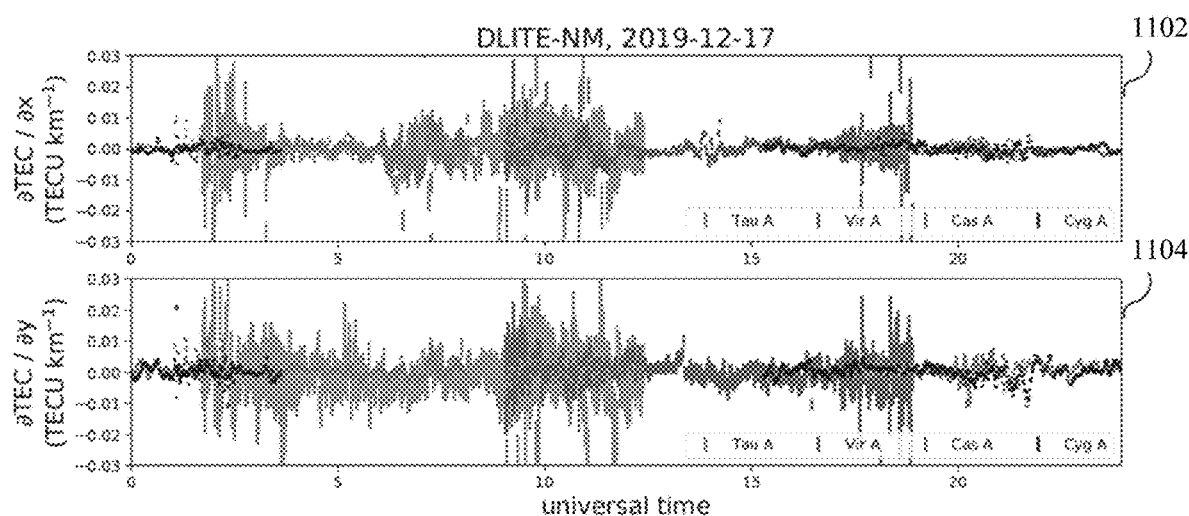
FIG. 11 depicts plots of total electronic content gradients toward the four brightest A-Team sources.

FIG. 11 depicts plots of TEC content gradients toward the four brightest A-Team sources. The final values for $\vec{\nabla}$TEC in the x (east/west) and y (north/south) direction for 17 Dec. 2019 for the four brightest A-Team sources are shown in FIG. 11. Upper panel 1102 shows east/west and lower panel 1104 shows north/south TEC gradients, and these include median bias corrections calculated as described above with full 2019/2020 dataset. The values are averaged between results from the two linear polarization. Error bars were calculated by computing root mean squared (RMS) difference between the two polarizations. Since the east/west extent of the array is larger, the resolution is better in that direction. Consequently, the ∂TEC/∂x is also better with median values of 0.0002 TECU km$^{-1}$ for Cyg A, Cas A, Vir A, and Tau A, respectively.

The errors are roughly inversely proportional to the sources' intensities at 35 MHz, as expected. Given the geometry of the array, these correspond to $\Delta$TEC precisions of around 0.002 TECU or better. Some residual confusion artifacts impacting Vir A near ~17 UT when it was setting and Cas A was rising may be seen in FIG. 11.

As evident in FIGS. 8-9, significant intensity fluctuations may be observed toward the A-Team sources. These may result from scintillations related to ionospheric irregularities on scales comparable to the Fresnel scale. At 35 MHz in the F-region, this is approximately 1 km. As will be described below, Cyg A, Cas A, and Vir A are bright enough that their observed intensity variations are typically dominated by these scintillations over system noise.

Figure 12:
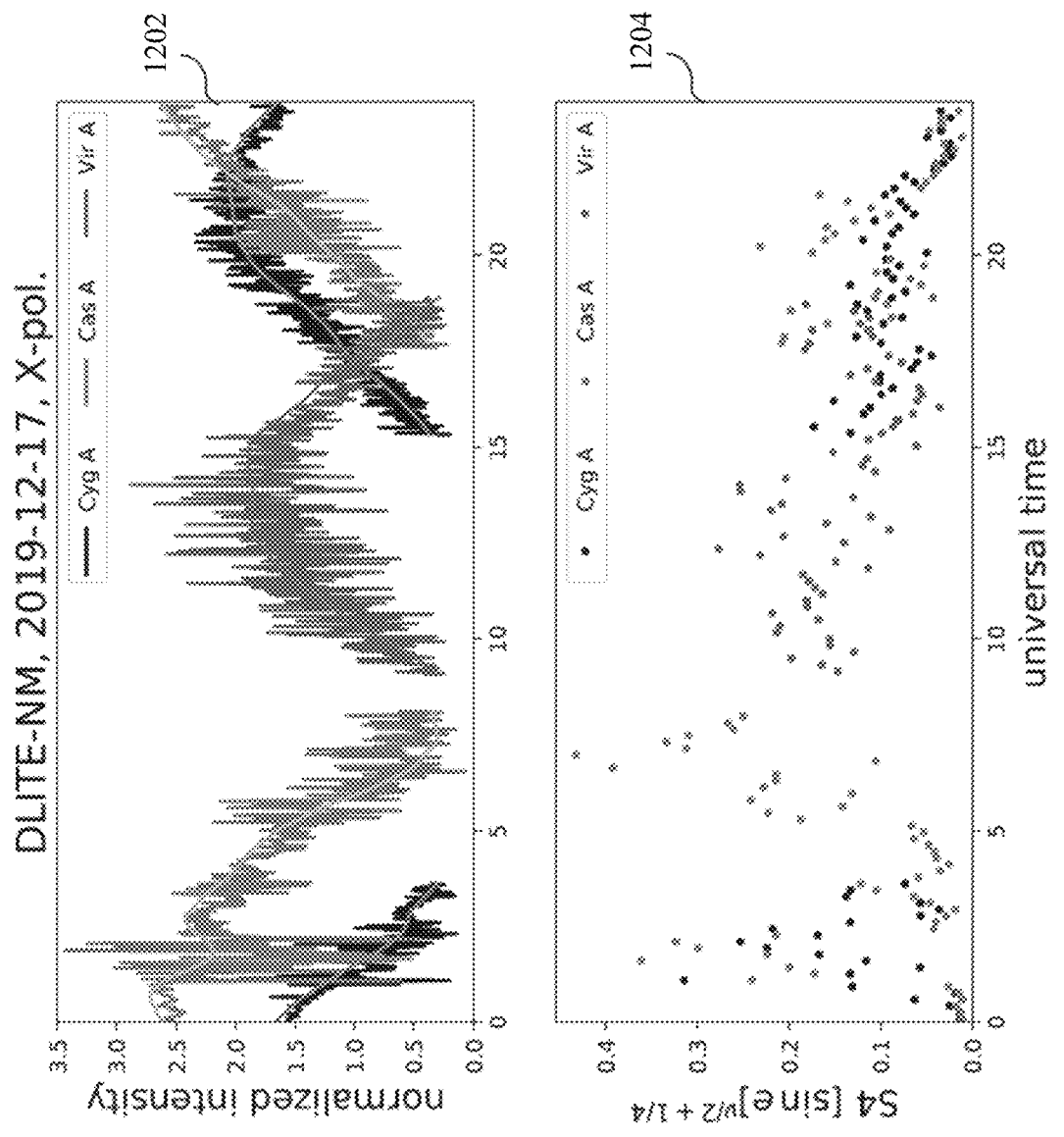
FIG. 12 depicts example plots of intensity time series for three bright A-Team sources.

For example, FIG. 12 depicts example plots of intensity time series for three bright A-Team sources. Upper panel 1202 shows the normalized X-pol. intensities extracted by the fitting algorithm with the initial, smooth estimates superimposed for comparison. These were used within 10-minute intervals to compute the S4 scintillation index by calculating the standard deviation of the ratio of the measured intensities to the initial/smoothed estimates. In lower panel 1204, these S4 measurements, multiplied by $(\sin e)^{v/2+1/4}$ to correct for observing geometry where the irregularity spectral index v was set to the typical value of 1.35, were plotted. Where the sources overlap in time, these geometry-corrected S4 values agree rather well. In this case, there appeared to be two periods of relatively intense scintillations post sunset (~00 UT). The scintillations then begin to die down around sunrise (~10 UT).

For a sparse array (e.g., four-element array), generating synthesis images in a manner similar to a telescope like the VLA may not be possible. However, with a relatively large fractional bandwidth (e.g., approximately 25%), even a single baseline may be used to generate an image of the sky via TDOA and FDOA. In radio astronomy parlance, these are delay and fringe rate, and each source on the sky has a unique coordinate in the TDOA, FDOA plane, which changes over time. If the system (including the atmosphere/ionosphere) is stable enough, a long enough integration time may be used such that the FDOA resolution projected on the sky is similar to that for TDOA. Due mainly to scintillations, there will be ionospheric artifacts on such images generated with a sparse array, and the characteristics of these artifacts may be used to produce a statistical description of both the level of scintillations and system noise.

Figure 13:
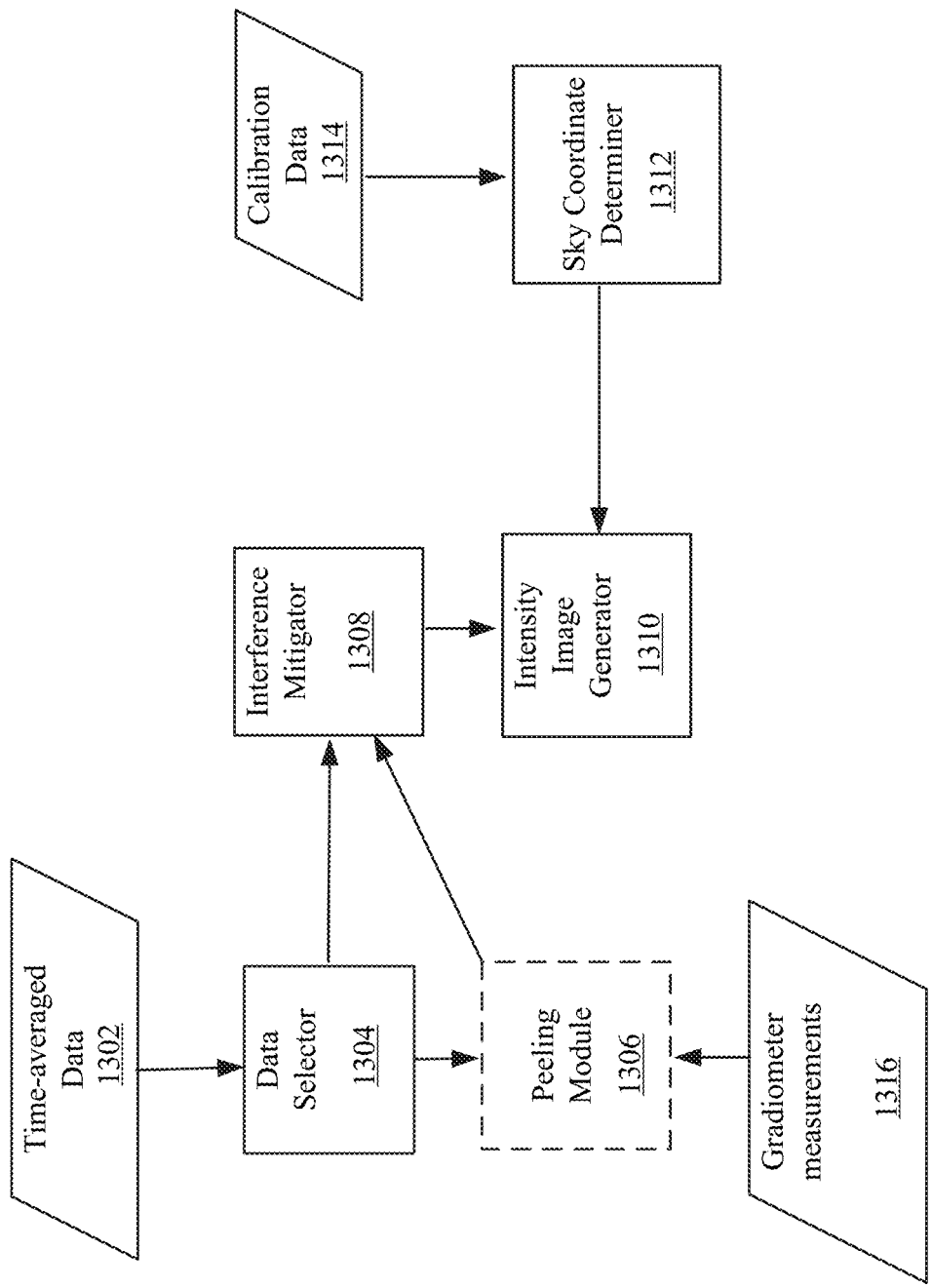
FIG. 13 is a block diagram of an imaging scintillometer, according to an example embodiment.

FIG. 13 is block diagram of an imaging scintillometer 1300, according to an example embodiment. Scintillometer 1300 is configured to generate a baseline image based on visibility data. Scintillometer 1300 includes a data selector 1304 configured to receive time-averaged data 1302, an interference mitigator 1308, an intensity image generator 1310, a sky coordinate determiner 1312 configured to receive calibration data, and an optional peeling module 1306 configured to receive ionosphere analysis data 1316. Scintillometer 1300 may include more or fewer components than shown in FIG. 13, and may be implemented by hardware and/or a combination of hardware and software, such as a digital backend. Scintillometer 1300 is configured to accept certain inputs, such as time-averaged data 1302, calibration data 1314, and ionosphere analysis data 1316. These inputs have been described above in reference to FIGS. 6 and 7, and thus will not be described again in detail.

For an interferometer set up such as systems 100, 200, 600, and 1300 in FIGS. 1, 2, 6, and 13, respectively, the sky position of a source is related to TDOA and FDOA on a baseline with differential coordinates, $\Delta x$, $\Delta y$, $\Delta z$ (east/west, north/south, vertical) by the following set of equations:

$$\text{TDOA} = c^{-1}(\Delta x l + \Delta y m + \Delta z n) + \text{TDOA}_{inst} \quad (3)$$

$$\text{FDOA} = \lambda^{-1}(\Delta x \dot{l} + \Delta y \dot{m} + \Delta z \dot{n}) \quad (4)$$

$$l = \cos e \sin a = -\sin h \cos \delta \quad (5)$$

$$m = \cos e \cos a = -\cos h \cos \delta \sin \phi + \sin \delta \cos \phi \quad (6)$$

$$n = \sin e = \cos h \cos \delta \cos \phi + \sin \delta \sin \phi \quad (7)$$

$$\dot{l} = -\omega_e \cos h \cos \delta \quad (8)$$

$$\dot{m} = \omega_e \sin h \cos \delta \sin \phi \quad (9)$$

$$\dot{n} = \omega_e \sin h \cos \delta \cos \phi \quad (10)$$

Within these equations, $\text{TDOA}_{inst}$ is the difference in cable delays between the two antennas, h is the hour angle (=LST−α; α=right ascension), δ is the declination, φ is the reference latitude for the array, and $\omega_e$ is the angular rotation rate of the Earth (in radian s$^{-1}$). Furthermore, c is the speed of light, λ is the observing wavelength, $\Delta x$ is the difference in east/west antenna positions, $\Delta y$ is the difference in the north/south antenna positions, and $\Delta z$ is the difference in antenna vertical positions.

For an embodiment of an east/west baseline of two antennas at the same height above sea level (i.e., $\Delta y = \Delta z = 0$), equations (3)-(10) show that TDOA and FDOA are proportional to the direction cosines of h and δ. Specifically, $\text{TDOA} = -(\sin h \cos \delta)\Delta x/c$ and $\text{FDOA} = -(\cos h \cos \delta)\Delta x \omega_e/\lambda$. The resolution in the sin h direction is $c/(\Delta x \Delta f)$, which is the TDOA resolution as mentioned above. In practice, since the spectral response is likely not flat, the actual resolution may be somewhat lower than this. The resolution in the cos h is $\lambda/(\Delta x \Delta t \omega_e)$. Thus, to achieve matching resolution in both directions, an optimum integration time of $\Delta t_{opt} = \omega_e^{-1} \Delta f/f$ may be utilized. For example, for the settings of $\Delta f = 8.33$ MHz and $f = 35$ MHz, this is 54 minutes.

For an embodiment of the opposite case, a north/south baseline of two antennas at the same height above sea level (i.e., $\Delta x = \Delta z = 0$), TDOA and FDOA are instead proportional to the direction cosines of e and a. Specifically, $\text{TDOA} = -(\cos a \cos e)\Delta y/c$ and $\text{FDOA} = -(\sin a \cos e \sin \phi)\Delta y \omega_e/\lambda$. Thus, for a north/south baseline at the equator, sources do not fringe (i.e., FDOA=0). Additionally, to get matching resolution in the sin a and cos a directions, the optimum integration time increases to $\Delta t_{opt} = (\omega_e \sin \phi)^{-1} \Delta f/f$. For embodiments described herein, this integration time may be approximately 90 minutes.

Figure 14:
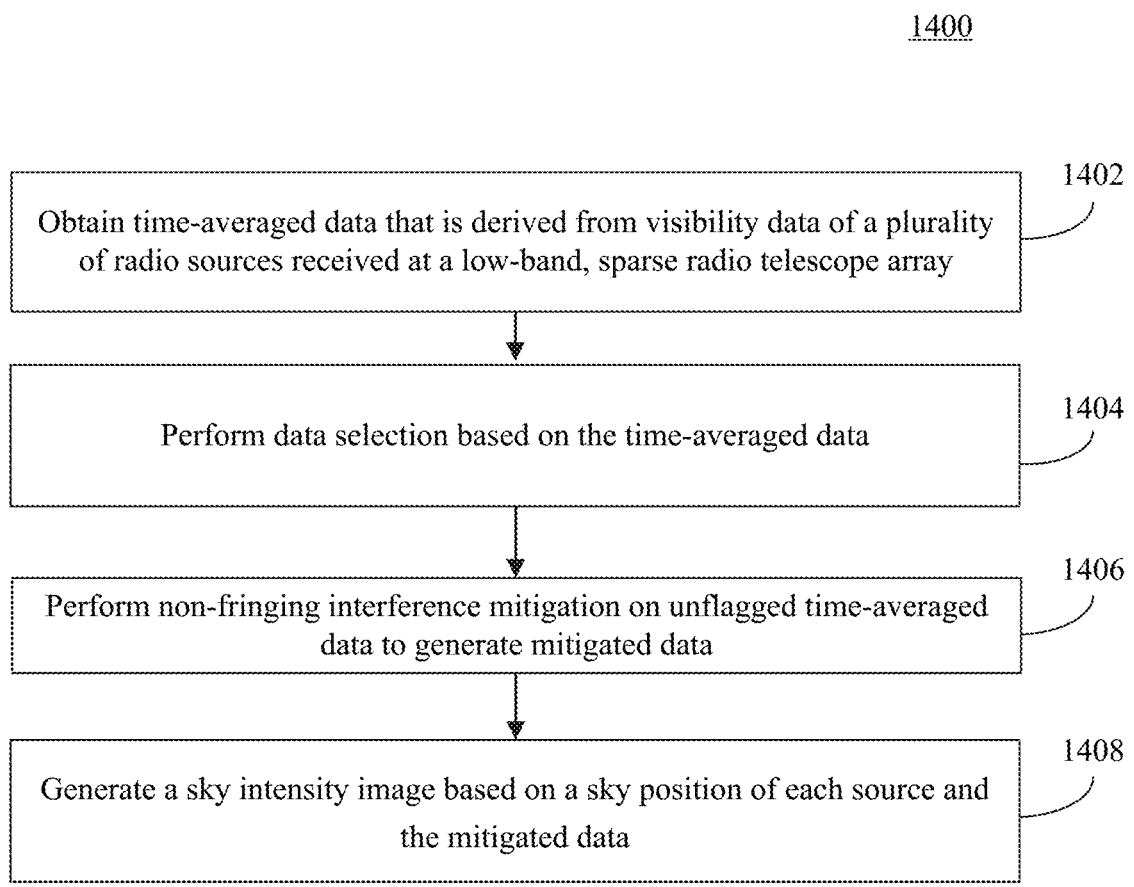
FIG. 14 depicts a flowchart for a method for baseline imaging, according to an example embodiment.

FIG. 14 depicts a flowchart 1400 for a method for baseline imaging, according to an example embodiment. Flowchart 1400 may be implemented using any of radio telescope array, system and/or subsystem described herein, for example, those shown in FIGS. 1, 2, 6, and 13. For convenience, FIG. 14 will be described in conjunction with FIG. 13, however, the implementation of flowchart 1400 is not so limited. This method generates an image of the sky that may be utilized to monitor for long-term changes (e.g., Cas A is slowing fading over time). Generally, the level of ionospheric intensity variations observed toward bright sources is the primary limit to image quality, which creates substantial artifacts within the image. The output of the method of FIG. 7 may be utilized to mitigate such artifacts, for example, with the peeling step described below. In embodiments, more or fewer steps of flowchart 1400 may be performed.

In step 1402, obtain time-averaged data that is derived from visibility data of a plurality of radio sources received at a low-band, sparse radio telescope array. For example, data selector 1304 may perform this step. In an embodiment, the visibility data may be received from a correlator and is processed (for example, as described above in step 702 of flowchart 700) to generate time-averaged data before it is received by data selector 1304. In another embodiment, the visibility data may be received and processed to generate time-averaged data by data selector 1304.

In step 1404, data selection is performed based on the time-averaged data. For example, data selector 1304 may be configured to perform data selection by selecting a baseline and time interval having a plurality of time steps and generating the unflagged time-averaged data based on the time-averaged data for the selected baseline. In a configuration where just one pair of antennas is used, then the associated baseline for that pair may be selected. In a configuration having multiple pairs of antennas, then any baseline may be selected in this step.

In step 1406, non-fringing interference mitigation is performed on unflagged time-averaged data to generate mitigated data. For example, interference mitigator 1308 may perform this step. In an embodiment, performing non-fringing interference mitigation includes applying a low-pass filter to the unflagged time-averaged data of the selected baseline per frequency channel.

In step 1408, a sky intensity image is generated based on a sky position of each source and the mitigated data. For example, intensity image generator 1310 may perform this step. In an embodiment, step 1408 may be implemented with the following steps: applying a two dimensional Hamming window to the mitigated data to generate an impulse response; performing a two-dimensional fast Fourier transform of the impulse response using a chosen time interval; and taking an absolute value of the fast Fourier transformed data to generate the sky intensity image.

While not shown in FIG. 14, a peeling step may be included in flowchart 1400 and may be performed by peeling module 1306, for example. This peeling step may be optional with gradiometer measurements being used correct for gain variations caused by the ionosphere to provide an enhanced sky intensity image. The peeling step may include computing ionosphere-corrupted source model visibility data based on ionosphere analysis data. The ionosphere-corrupted source model may be subtracted from the time-averaged data of the selected baseline via a linear fit operation to generate residual data. An uncorrupted model may be added to the residual data to generate peeled data to be utilized as the unflagged time-averaged data for the non-fringing interference mitigation step.

In operation, a TDOA, FDOA image may be generated for a single baseline by simply performing a two-dimensional (2D) FFT of the visibilities that are functions of frequency and time (e.g., FIGS. 4-5), using a chosen time interval. Since the visibilities are cross correlations between antenna pairs, taking the absolute value of this FFT produces an all-sky intensity image. In practice, it is beneficial to apply a window function to the visibilities to yield a well behaved impulse response. For example, a 2-D Hamming window may be used. Additionally, data may be occasionally affected by broadband interference, which may be dealt with during this process. Since stationary RFI has FDOA=0 on all baselines, this may be done by applying a high-pass filter to the visibilities per frequency channel before running the 2-D FFT. There may be times when one of the A-Team sources has FDOA≅0 on a particular baseline, and so this filtering may affect them as well. However, a source will not meet this criterion on all baselines at the same time if the baseline orientations are significantly different. An example filtering process that may be utilized includes subtraction of a complex-valued linear fit to the visibilities versus time within each frequency channel.

Figure 15:
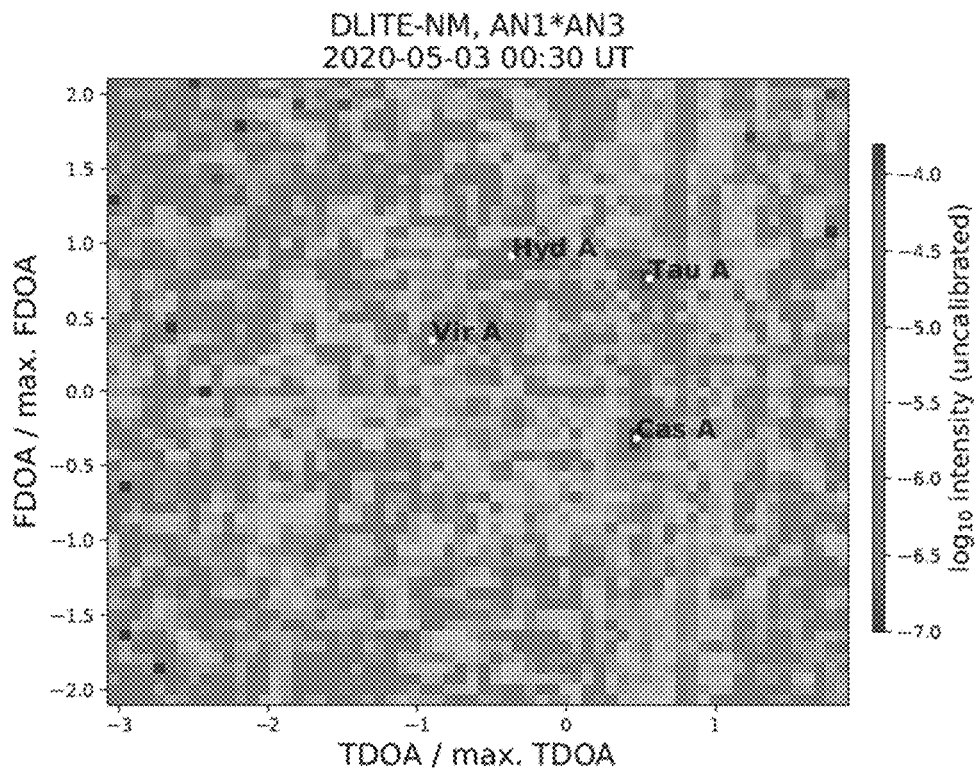
FIG. 15 is an example sky intensity image using a long east/west baseline.
Figure 16:
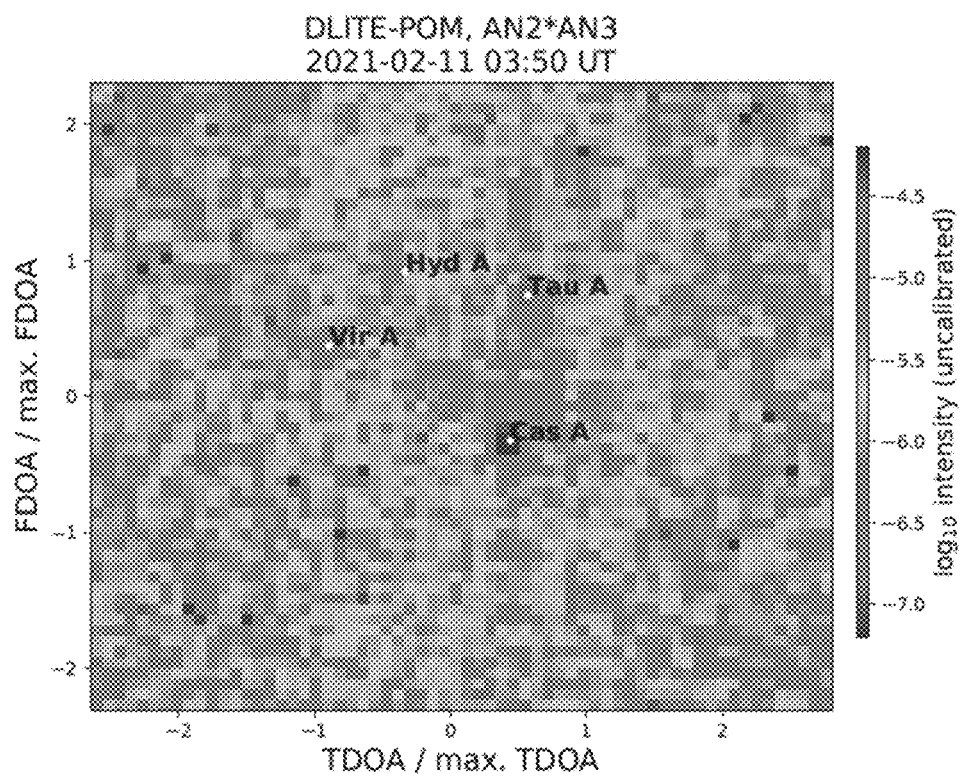
FIG. 16 is an example sky intensity image using an expanded east/west baseline.

FIG. 15 is an example sky intensity image using a long east/west baseline of the system in New Mexico on 5 May 2020. FIG. 16 is an example sky intensity image using an expanded east/west baseline of the system in Maryland. In each figure, one hour of data was used to make the image, and the locations of visible A-Team sources are marked. The baselines associated with FIG. 15 and FIG. 16 had lengths of 460 m and 420 m, respectively. For the image in FIG. 15, the TDOA origin is shifted from the center of the plot to account for differential cable delay. In both FIGS. 15 and 16, the TDOA and FDOA have been normalized to the maximum values for sources above the horizon for that baseline. Thus, any intensity outside a unit-radius circle centered at the origin is not from the sky. Some residual contamination from broadband interference is visible due mostly to variations in the intensity of the interference over the imaged time interval that broadens its FDOA profile. Some level of Galactic emission may be seen, especially within the image of FIG. 16.

In both images, there are also vertical artifacts associated with some sources, especially Cyg A and Cas A in FIG. 16. These are signatures of scintillations. Ionospheric scintillations cause temporal variations in intensity, which raise the noise floor in the FDOA direction only. Thus, the magnitude of these linear features relative to the measured intensity of the source in the image gives an alternative measure of the S4 index. In this case, because of the Hamming window that was used, this measurement of S4 applies to a time period of about 30 minutes. Ionospheric phase variations also have some effect on these images by blurring the sources out as they appear to move on the sky. However, with the Hamming window applied, the resolution of these images is about 9° and as the results show (e.g., in FIGS. 8-10), the ionospheric position shifts are typically a few tenths of a degree. Thus, the baseline-based images are generally a much more useful tool for the characterizing intensity rather than phase variations.

At mid-latitudes, the weak scattering approximations are appropriate for extracting statistical parameters regarding km-scale ionospheric irregularities from these measurements. Specifically for a power-law spectrum of density irregularities, the variance in the intensity is given by $$\sigma_I^2 = I^2 \frac{C_k L}{\sin e}(r_e \lambda)^2 \left(\frac{2\pi}{1000}\right)^{2v-1} \left(\frac{z_R \lambda}{2\pi \sin e}\right)^{v-0.5} \frac{P(v) F_s(v)}{D_S} + \sigma_{sys}^2 \quad (11)$$

$$F_s(v) = \frac{\Gamma\left(1.25 + \frac{v}{2}\right)}{2^{v-0.5} \sqrt{\pi} \Gamma\left(\frac{v}{2} + 0.25\right)(v - 0.5)} \quad (12)$$

with all quantities specified in MKS units. In equation (11), $r_e$ is the classical electron radius, $z_R$ is the irregularity height, $\sigma_{sys}$ is the system noise, and P is a geometric and propagation factor that depends on the orientation of the irregularities relative to the line of sight. For mid-latitudes, it is generally a good assumption that the irregularities are aligned along magnetic field lines with major/minor axis ratios of about 10:1, which is what is assumed here. It is also assumed that the irregularities are at a height of 300 km, but note that the dependence on assumed height is relatively weak ($\propto z_R^{0.85}$). The factor $C_k L$ in equation (11) represents the strength of the irregularities at a scale of 1 km, and the shape of the irregularity spectrum is represented by v, which is usually assumed to be 1.35. Note that this value of v gives a phase structure function with a power law slope of 1.7, which is essentially the same as the slope of 5/3 predicted for turbulence. In this regard, the $C_k L$ parameter is similar to the integrated $C_N^2$ profile used in optical astronomy to characterize the impact of tropospheric turbulence.

The factor of $D_S$ in equation (11) is a dilution factor that is specific to each A-Team source and accounts for its extended nature (i.e., they are not point sources). If each source is approximated as a collection of point source, then each will scintillate separately and their variances will add in quadrature. If these sources are placed on a 2-D grid on the sky (with some grid points allowed to have I=0), it is only the distribution of intensity along the vector that is perpendicular to the orientation of the irregularities projected onto this grid that matters. In other words, the derivation of equation (11) involves a change of variables that reduces the description of the irregularity field to a single variable, and the characterization of the source intensity must follow suit.

Thus, if an i, j grid is situated such that the i axis is perpendicular to the irregularities, the observed variance will be $$\frac{\sigma_{I,obs}^2}{I_{obs}^2} = \frac{\sum_{i=1}^{N_i} I_{i,j=j_0}^2}{\left(\sum_{i=1}^{N_i} I_{i,j=j_0}^2\right)^2} \quad (13)$$

where C' contains $C_k L$ and all the geometric/spectral factors from equation (11). For a single point source, the relative variance simply reduces to C'. For a uniform source, it simplifies to $C'/N_i$. Rather than configure a custom grid for every possible observing orientation, it is prudent to define a single mean 1-D dilution factor by recasting the summations in equation (13) to be over the entire 2-D grid. Taking the square roots of these summations provides a mean characterization of the 1-D versions in equation (13) for all projected orientations in the image plane of the 1-D version in equation (13) for all projected orientations in the image plane grid. Therefore, the dilution factor is assumed to be $$D_S = \frac{\left(\sum_{i=1}^{N_i}\sum_{j=1}^{N_j} I_{i,j}\right)^2}{\sum_{i=1}^{N_i}\sum_{j=1}^{N_j} I_{i,j}^2} \quad (14)$$

From the existing models of A-Team sources, the $D_S$ values have been derived at 35 MHz to be 5.0, 10.5, 5.2, and 1.9 for Cyg A, Cas A, Vir A, and Tan A, respectively. The relatively large value for Cas A is due to its extended, ring-like shape. $D_S$ values have not been calculated and set to unity for the remaining two A-Team sources due to the lack of available models at 35 MHz and the fact that they are typically not bright enough to scintillate above the system noise.

From equation (11), when multiple sources are visible and provide multiple measures of $\sigma_I = I$ (and different values of e, P, and $D_S$), a linear fit may be used to determine mean values for $C_k L$ and $\sigma_{sys}$ among all the sources. This provides a more robust determination of both quantities than can be done with a single source. In this regard, sources that are too faint to scintillate are just as important since they provide a good constraint on $\sigma_{sys}$.

The imaging methods described herein not only allow for unique statistical characterizations of VHF scintillation activity, but they also enable the search for transient and variable cosmic radio sources. The 1-σ sensitivity of a single one-hour image is about 23 Jy. Averaging together measurements from all six baselines and both linear polarization reduces this to 6.7 Jy, or a 5-σ detection limit of 33 Jy. Perhaps the most obvious source that fills this brightness requirement is the Sun. At microwave frequencies, the Sun tends to be consistent on relatively long time scales (~ days). However, that emission is from close to the Sun's surface. Emission at 35 MHz is much more likely to come from far out in the corona (~1-2 solar radii above the surface), and is a mix of volatile bursts lasting several seconds up to many minutes, and a lower-level component that varies on longer time scales (hours to days).

When they occur, solar radio bursts typically make the Sun the brightest radio source in the sky, and so they are usually detectable with a single antenna. They are distinguished by their temporal and spectral behavior. Within this context, the sparse radio telescope array descried herein provides an opportunity to study the properties of these bursts in more detail given the higher S/N achievable with the array. In particular, the low-frequency nature and relatively long duration type II and IV bursts make them especially good targets for long-term synoptic studies of the Sun by the sparse radio telescope array. For this, the 1-s, full spectral resolution visibility data may be more appropriate than the lower resolution, flagged data used for ionospheric analysis and imaging. In fact, man y bursts are likely to be flagged within the 1-minute data.

To coherently combine the data from the fully array, a useful quantity is the bispectrum. This combines visibilities from each unique triangle/triple within the array such that the phase of the resulting complex quantity is the so-called closure phase. For antennas, i, j, and k, it is given by $$Bs = V_{i,j} V^*_{i,k} V_{j,k} \quad (16)$$

Antenna-based phase errors sum to zero within the closure phase as does the phase contribution from a single dominant point source. When there is a dominant source within the field of view, Bs is therefore entirely real and the imaginary part is fully noise/artifacts. It is known that for a four-element interferometer, like the sparse radio telescope array described herein, the ratio of the bispectrum S/N to that of a spectrum incoherently averaged from four antennas recorded separately is $s^2/2$, where s is the S/N on a single baseline. Thus, for $s > \sqrt{2}$, the S/N is larger for the bispectrum and increases rapidly with s. Therefore, the bispectrum is particularly useful for searching interferometry data for bright transient sources without having to generate all-sky images on short time scales.

Figure 17:
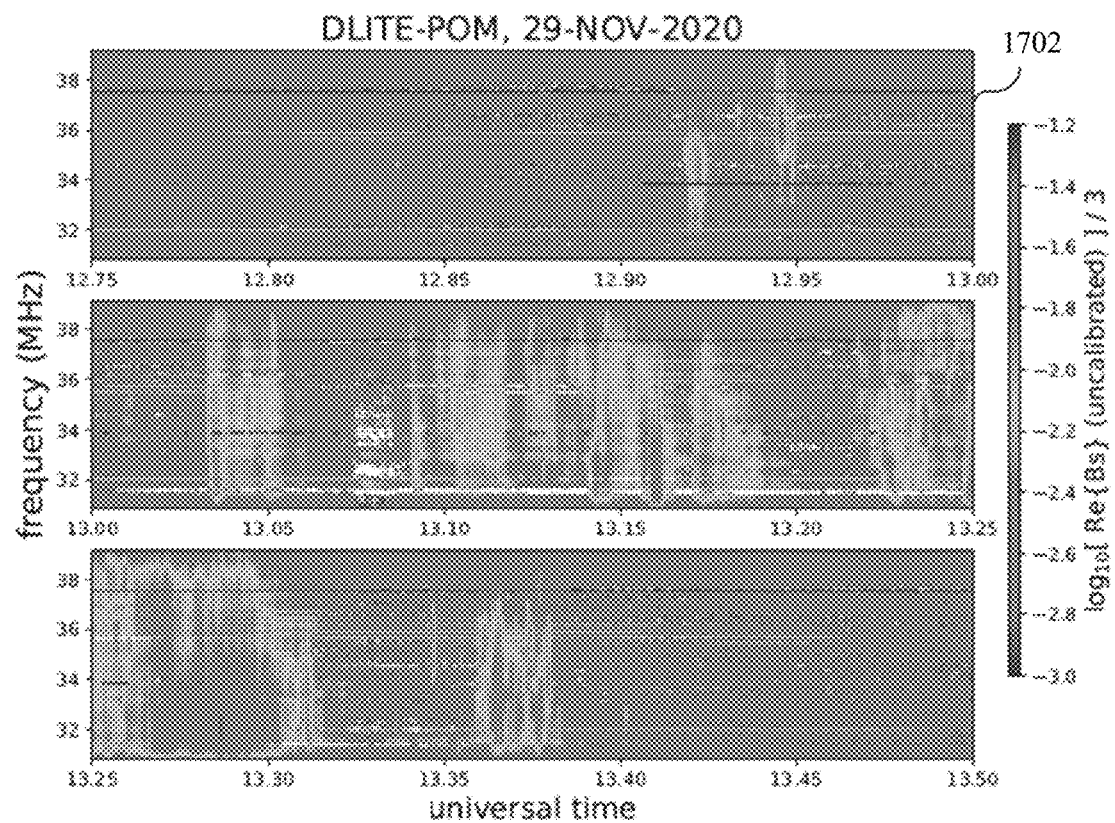
FIG. 17 depicts an example real part of a bispectrum during a period of solar activity.

FIG. 17 depicts an example real part of a bispectrum during a period of solar activity. The features seen in upper panel 1702 correspond to a type II burst. FIG. 17 shows the bispectrum coherently averaged over all four triples of the system in Maryland from 29 Nov. 2020. The $\log_{10}$ of the real part of the Bs is displayed with a small bias factor added to avoid taking the $\log_{10}$ of negative values. Anomalously negative values that are smaller than this bias are blanked (i.e., shown as white). In $\log_{10}$ space, the Bs values were divided by three to convert them into the equivalent received power. Within the time range displayed, a large flare was detected and a coronal mass ejection was launched. Around 12:55 UT, a fundamental harmonic of a type II burst are apparent. A relatively long-duration (~20 minutes) type IV burst then starts at around 13:02 UT. While the same bursts are evident within single-antenna data obtained from stations within the e-Callisto network, the enhanced S/N of the sparse array bispectrum allows f or a more detailed exploration of the temporal and spectral structure of the bursts. The e-Callisto spectra showed no evidence of emission at higher frequencies from the type IV burst, strongly implying that it was a so-called "moving type IV" burst, likely associated with the coronal mass ejection that was observed by space-based observatories at 13:34 UT observed by space-based observatories at 13:24 UT.

A similar but quite distinct phenomenon occurs when the magnetic field of Jupiter interacts with its moon Io and its ejecta. These bursts are mostly confined to decameteric wavelengths at frequencies lower than the nominal band of 30-40 MHz, but they may be detected above 30 MHz. They contain much more temporal and frequency structure than most solar bursts and often consist of several trains of short, ms-scale bursts. However, like solar bursts, these phenomena make Jupiter the dominant source in the radio sky and may be similarly characterized with the bispectrum approach.

Figure 18:
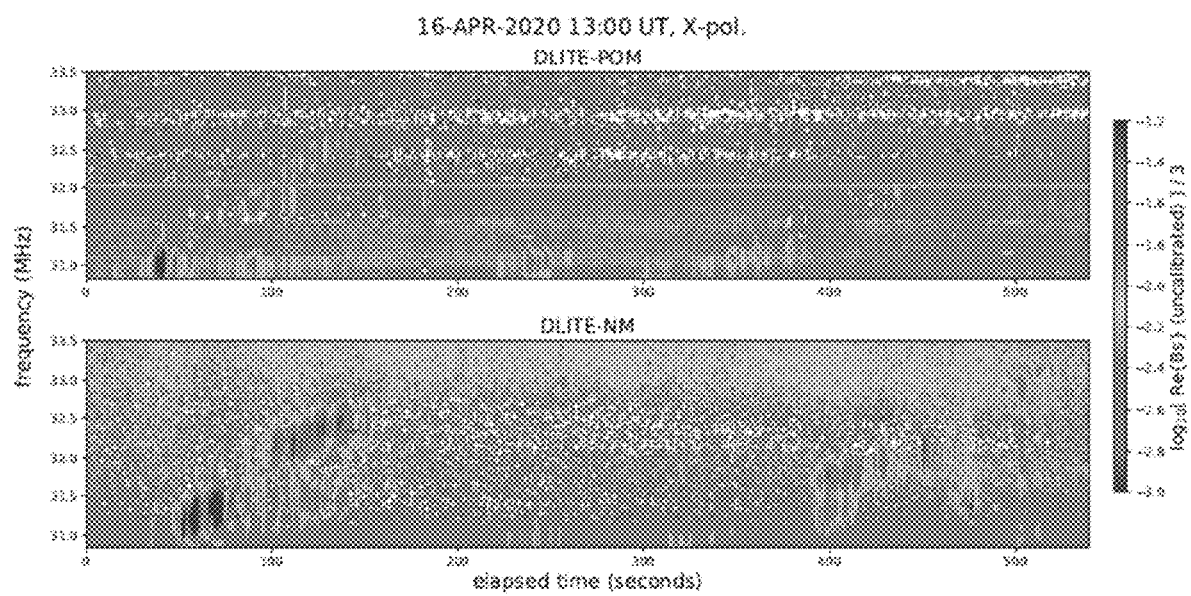
FIG. 18 depicts example real parts of a bispectra from two radio telescope arrays during an Io-B Jupiter burst.

FIG. 18 depicts example real parts of a bispectra from two radio telescope arrays during an Io-B Jupiter burst (X-polarization). The starting point of the abscissa in each panel is 13 UT. FIG. 18 shows bursts simultaneously detected with both systems in Maryland and New Mexico. While structures detected by both arrays are similar, there are also significant differences. These discrepancies are likely due in large part to the fact that the bursts are structured on time scales much shorter than the 1–s integration time, and the two arrays' clocks are not synched to one another. There are also differences between the two arrays in the structures of their noise floors that likely contribute.

Note that Jupiter bursts are highly circularly polarized, and thus to properly optimize a radio telescope array to observe this phenomenon, the bandwidth should be decreased to 6.25 MHz to allow full polarization products to be generated. It should also be tuned to a lower frequency (in the ~20-30 MHz range). For example, on 18 Mar. 2021, visibilities with all four polarization products, 6.25 MHz of bandwidth, and a central frequency of 30 MHz for four hours centered around an expected Io-B event were recorded for the system Maryland. These visibilities were converted to RHCP and LHCP (i.e., RR=[XX+YY+iXY−iYX]/2 and LL=[XX+YY−iXY+iYX]/2), and the resulting bispectra are show in FIG. 19.

Figure 19:
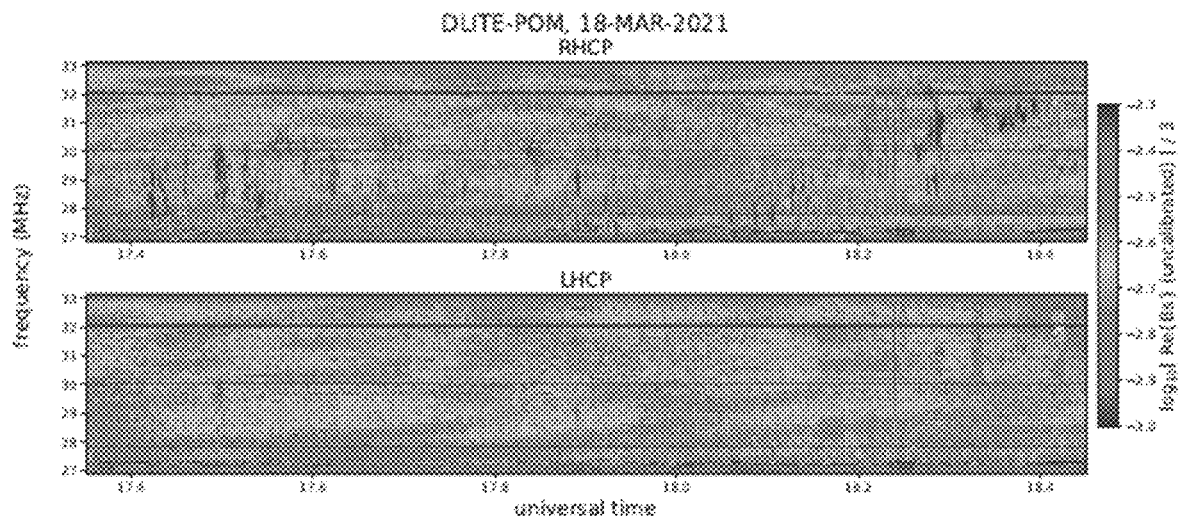
FIG. 19 depicts an example real part of a bispectrum from a radio telescope array during an Io-B Jupiter burst.

FIG. 19 depicts an example real part of a bispectrum from a radio telescope array during an Io-B Jupiter burst converted to right hand circular polarization (RHCP, shown in the upper panel) and left hand circular polarization (LPCP, shown in lower panel). The array is located in Maryland and the large structures apparent in time/frequency are from a combination of Cyg A and Cas A. Io-B bursts are normally almost entirely positively circularly polarized and the bispectra in FIG. 19 show this. This confirms not only the utility of the radio telescope array described herein for observing transients, but also the polarization stability of the system.

Under less extreme conditions, the Sun and Jupiter are far from the brightest objects in the sky at 35 MHz, and the single-antenna or bispectrum approaches may not work. To characterize lower-level intensity variations, the imaging methods described above may be more appropriate. A consideration for this approach is that the background sky emission is not uniform. At VHF frequencies, the sky is virtually filled with Galactic synchrotron emission, but is heavily concentrated near the Galactic plane. Since the sky looks the same at a fixed LST for a particular site, a large synoptic database of images may be binned by LST to generate low-noise background images. For a database that spans multiple seasons, this works for the Sun as well because unlike distant cosmic sources, the Sun's right ascension and declination change continuously throughout the year. To this end, images may be binned per baseline for the system in New Mexico within 72 LST bins and computed the median intensity per pixel.

Figure 20:
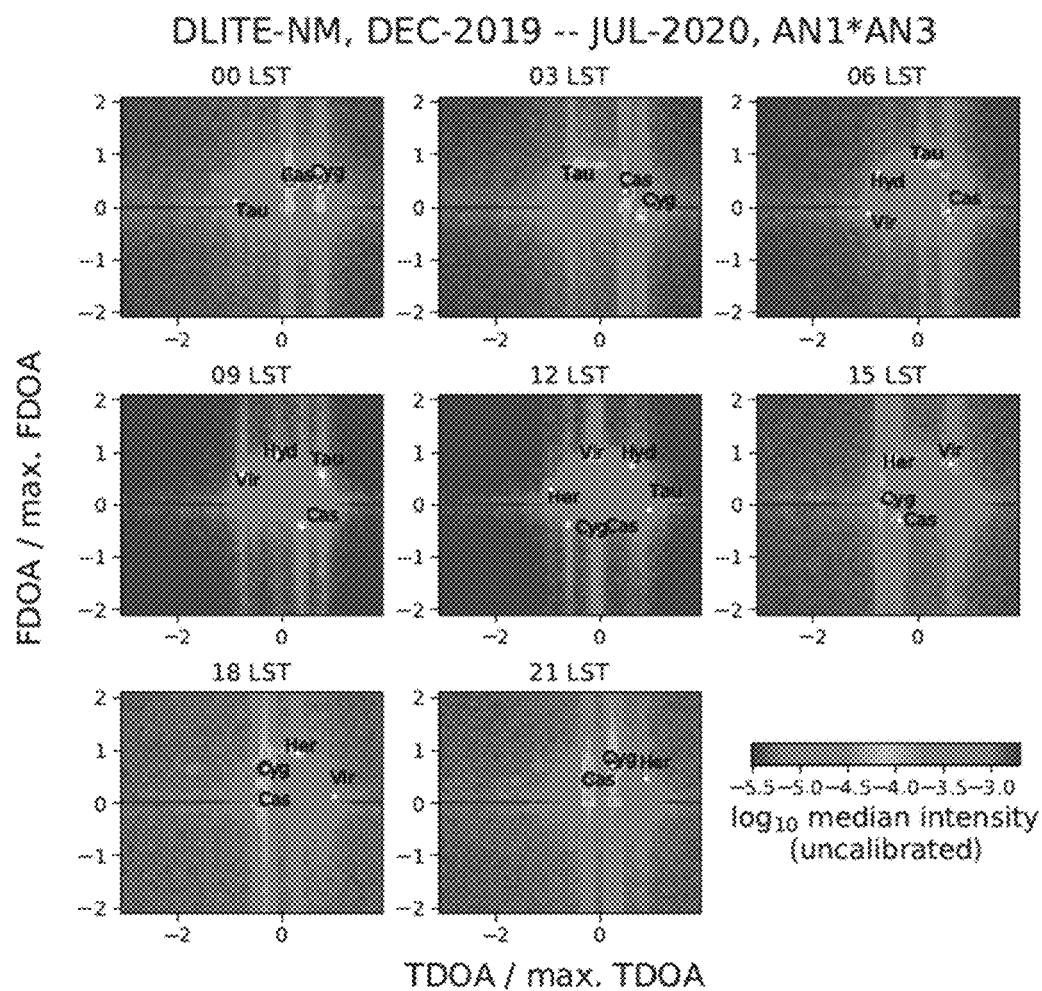
FIG. 20 shows the images for the longest baseline of the system in New Mexico.

FIG. 20 shows the images for the longest baseline of the system in New Mexico. Within these images, it is possible to see the A-Team sources rise and set as well as emission from the Galactic plane. There is also a persistent artifact at FDOA 0 from the low-pass filtering that is used to mitigate stationary RFI.

Figure 21:
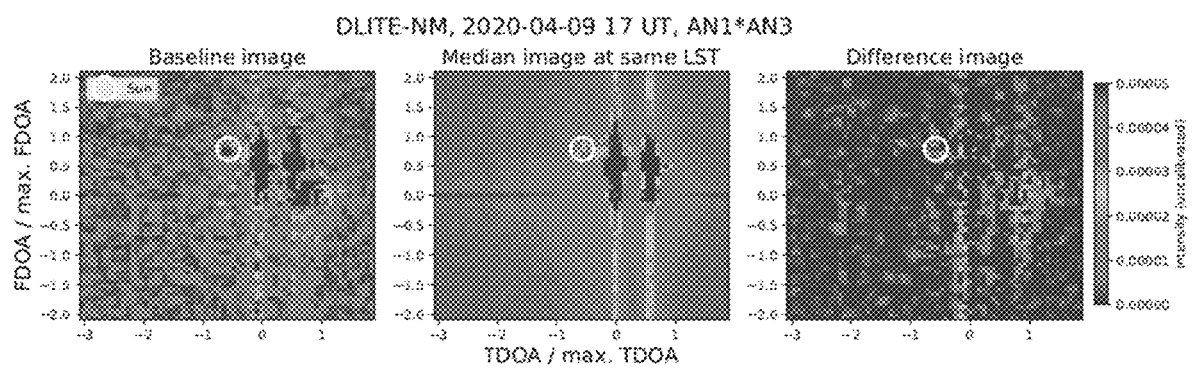
FIG. 21 illustrates a process of mitigating scintillation related variability.

Using the Sun as an example of a variable/transient source, the images may be used to obtain measures of background-subtracted intensity. For each time step and baseline, the background LST image cube may be interpolated to the LST for that time step on a pixel-by-pixel basis. This background image may then be scaled to better match the current image to account for possible variations in the system gain. The scaled background image may be then subtracted before measuring the intensity of the Sun. At each time step, the results from all baselines may be combined by computing the median background-subtracted intensity among them. FIG. 21 illustrates this process of mitigating scintillation related variability. From FIG. 21, it is possible to see that regions near the very bright sources Cyg A and Cas A may be problematic due to scintillation related variability, which may be mitigated by using the median among all six baselines.

Example Computer System Implementation

Each system, subsystem, component and flowchart (e.g., as shown in FIGS. 1-3, 6, 7, 13, 14 and 22) described herein may be implemented in hardware, or hardware combined with software or firmware. For example, each system, subsystem, component and flowchart may be implemented as computer program code/instructions configured to be executed in one or more processors and stored in a computer readable storage medium. Alternatively, each system, subsystem, component and flowchart may be implemented as hardware logic/electrical circuitry.

The terms "computer program medium," "computer-readable medium," and "computer-readable storage medium" are used herein to refer to physical hardware media such as the hard disk associated with a storage device. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

In an embodiment, system components may be implemented in a system-on-a-chip (SoC). The SoC may include an integrated circuit that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 22:
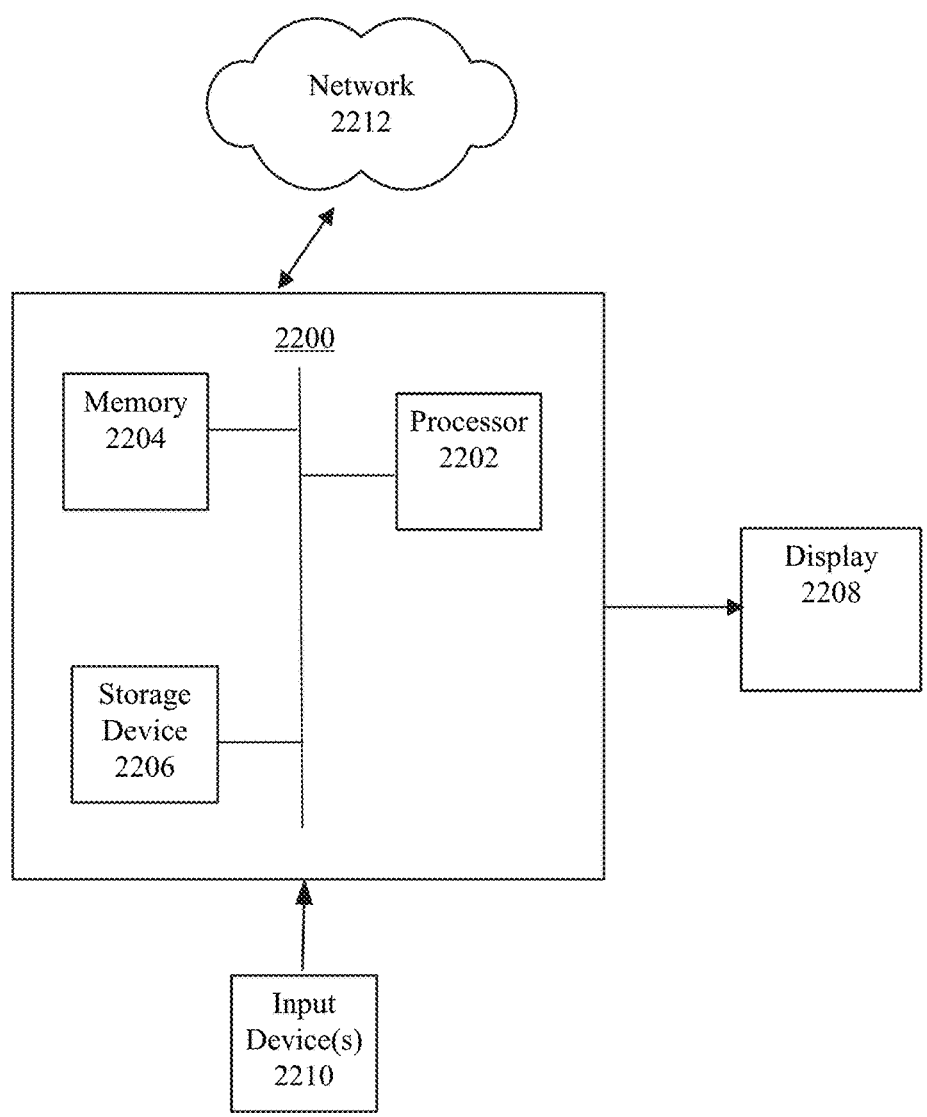
FIG. 22 depicts a block diagram of an example computer system in which embodiments may be implemented.

FIG. 22 is a block diagram of an example computer system in which embodiments may be implemented. The description of computing device 2200 is provided for purposes of illustration, and is not intended to be limiting. Embodiments may be implemented in further types of computer systems, as would be known to persons skilled in the relevant art(s).

As shown in FIG. 22, computing device 2200 includes processor 2202, memory 2204, and storage device 2206, and these components may be coupled together via a bus.

Processor 2202 may be referred to as a processor circuit or a processing unit. Processor 2202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor 2202 may execute program code stored in a computer readable medium, such as program code of an operating system, an application program, and other programs.

Memory 2204 includes any system memory, for example, read only memory (ROM) and random access memory (RAM) and may store a basic input/output system (e.g., BIOS).

Storage device 2206 may include any a hard disk drive, a magnetic disk drive, an optical disk drive, a removable optical disk (e.g., CD ROM, DVID ROM), a flash memory card, a digital video disk, RAMs, ROMs, or other hardware storage media. Storage device 2206 and its associated computer readable media provide nonvolatile storage of computer-readable instructions, data structures, program modules and other data for computing device 2200.

A number of program modules may be stored on memory 2204 and/or storage device 2206. These programs include an operating system, an application program, other programs, and program data. Such an application program or other programs may include, for example, computer program logic (e.g., computer program code or instructions) for implementing system components and/or embodiments described herein.

A user may enter commands and information into the computing device 2200 through input devices 2210 such as a keyboard and a pointing device. Other input devices (not shown) may include a microphone, joystick, game pad, satellite dish, scanner, touch screen and/or touch pad, voice recognition system to receive voice input, gesture recognition system to receive gesture input, or the like. These and other input devices are often connected to processor 2202 through a serial port interface that is coupled to bus 2214, but may also be connected by other interfaces, such as a parallel port, game port, or a universal serial bus (USB).

A display 2208 is also connected to the bus via an interface, such as a video adapter. Display 2208 may be external to or incorporated in computing device 2200. Display 2208 may display information, as well as being a user interface for receiving user commands and/or other information (e.g., by touch, finger gestures, virtual keyboard, etc.). In addition to display 2208, computing device 2200 may include other peripheral output devices (not shown) such as speakers and printers.

Computing device 2200 is connected to a network 2212 (e.g., the Internet) through an adaptor or network interface, a modem, or other means for establishing communications over the network.

CONCLUSION

While various embodiments of the disclosed subject matter have been described above, it should be understood that they have been presented by way of example only, and not limitation. Various modifications and variations are possible without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
    a digital backend comprising:
        a bias-t unit;
        a first software-defined radio and a second software-defined radio, each being communicatively connected to the bias-t unit and a reference clock;
        a processing unit configured to be coupled to the first software-defined radio and the second software-defined radio; and
    a first antenna and a second antenna, each being communicatively coupled with the digital backend and configured to receive visibility data by tracking a plurality of radio sources.

2. The system of claim 1, wherein the digital back end is configured to determine ionospheric gradients and scintillation indices based on the visibility data.

3. The system of claim 1, wherein the first antenna and the second antenna are separated from one another by a length that is between two hundred and five hundred meters, the length being selected to be long enough to resolve the sources from one another via a time difference of arrival method.

4. The system of claim 1, wherein the first antenna and the second antenna are communicatively coupled to the digital backend with low-loss coaxial cables or radio frequency over fiber technology.

5. The system of claim 1, further comprising:
    a third antenna being communicatively coupled with the digital backend.

6. The system of claim 5, further comprising:
    a fourth antenna being communicatively coupled with the digital backend,
    wherein the first, second and third antennas are configured to form a triangle shape with the fourth antenna being placed approximately at a center of the triangle.

7. A method for analyzing ionospheric data, comprising:
    processing visibility data of a plurality of radio sources received at a low-band, sparse radio telescope array to generate time-averaged data;
    performing fringe stopping to generate fringe-stopped data based on the time-averaged data;
    performing confusion mitigation of the fringe-stopped data to generate confusion-corrected data;
    generating postage stamp images based on the confusion-corrected data;
    determining source properties for the sources using the postage stamp images; and
    outputting ionosphere analysis data based on the source properties.

8. The method of claim 7, further comprising calibrating the time-averaged data to generate calibration data by
    collecting time-averaged data, timestamps, and approximate antenna positions of the sparse radio telescope array;
    determining model visibilities for the sources;
    based on the model visibilities, refining the approximate antenna positions and determining cable delays; and
    outputting calibration data that comprises the refined approximate antenna positions and cable delays.

9. The method of claim 7, wherein processing visibility data comprises:
    collecting the visibility data from a correlator;
    flagging spurious visibility data;
    averaging unflagged visibility data to generate the time-averaged data; and
    outputting the time-averaged data and timestamps to a file.

10. The method of claim 7, wherein performing fringe stopping comprises:
- obtaining the time-averaged data, timestamps, and calibration data;
- at each time step correcting associated visibility data for an expected time difference of arrival per source to generate corrected visibility data;
- averaging all corrected visibility data over all frequencies per baseline;
- generating normalized visibility data to remove any bulk complex gain offsets among all baselines based on the averaged, corrected visibility data; and
- smoothing the normalized visibility data with a particular time window to generate the fringe-stopped data.

11. The method of claim 7, wherein performing confusion mitigation comprises:
- determining initial intensity estimates for the sources based on amplitudes of the fringe-stopped data;
- for each source,
  - generating a first model of fringe-stopped visibility data for that source and baseline based on the initial intensity estimates, known source positions, and calibration data;
  - generating a second model of residual visibility data from other sources, including non-fringing sources;
  - normalizing the first model and the second model; and
  - fitting a linear combination of the normalized first model and the second model to the visibility data of that source while subtracting contribution from the other sources to generate the confusion-corrected data for that source.

12. The method of claim 11, wherein the generating postage stamp images comprises:
- applying complex gain correction by dividing each baseline by an average of confusion-corrected data for the sources;
- generating the postage stamp images by forming a postage stamp image around each source based on all baselines; and
- utilizing the postage stamp images to determine an apparent position and apparent amplitude for each source.

13. The method of claim 12, wherein determining source properties comprises:
- comparing the apparent amplitude and apparent position and position and amplitude from a previous iteration for each source to determine fit convergence;
- upon determining that there is fit convergence, setting the apparent position and apparent amplitude as a final position and final amplitude, and determining a final source position offset for each source based on the final position; and
- upon determining that there is no fit convergence, updating a measured amplitude and position of each source from a previous iteration based on the postage stamp images generated in a current iteration.

14. The method of claim 13, further comprising:
- updating the fringe-stopped data with the updated expected position and expected amplitude; and
- repeat the performing confusion mitigation and the generating the postage stamp images steps until there is fit convergence or for a predefined number of iterations.

15. The method of claim 13, further comprising:
- providing the final source position offset, an initial position and an initial amplitude for each source along with timestamps as an output.

16. A method for baseline imaging, comprising:
- obtaining time-averaged data that is derived from visibility data of a plurality of radio sources received at a low-band, sparse radio telescope array;
- performing data selection based on the time-averaged data;
- performing non-fringing interference mitigation on unflagged time-averaged data to generate mitigated data;
- generating a sky intensity image based on a sky position of each source and the mitigated data.

17. The method of claim 16, wherein performing data selection comprises:
- selecting a baseline and a time interval having a plurality of time steps; and
- generating the unflagged time-averaged data based on the time-averaged data for the selected baseline.

18. The method of claim 16, performing non-fringing interference mitigation comprises:
- applying a low-pass filter to the unflagged time-averaged data of the selected baseline per frequency channel.

19. The method of claim 18, further comprising:
- computing ionosphere-corrupted source model visibility data based on ionosphere analysis data; and
- subtracting the ionosphere-corrupted source model visibility data from the time-averaged data of the selected baseline via a linear fit operation to generate residual data; and
- adding an uncorrupted model to the residual data to generate peeled data to be utilized as the unflagged time-averaged data for the non-fringing interference mitigation step.

20. The method of claim 18, wherein the generating a sky image comprises:
- applying a two dimensional Hamming window to the mitigated data to generate an impulse response;
- performing a two-dimensional fast Fourier transform of the impulse response using a chosen time interval; and
- taking an absolute value of the fast Fourier transformed data to generate the sky intensity image.

* * * * *